US012625735B2

(12) United States Patent     (10) Patent No.:   US 12,625,735 B2
Zhu et al.          (45) Date of Patent:     May 12, 2026

(54) PROACTIVE RESOURCE PROVISIONING IN LARGE-SCALE CLOUD SERVICE WITH INTELLIGENT POOLING

(71) Applicant: Microsoft Technology Licensing, LLC, Redmond, WA (US)

(72) Inventors: Yiwen Zhu, Bellevue, WA (US); Alex Yeo, Redmond, WA (US); Harsha Nihanth Nagulapalli, Redmond, WA (US); Sumeet Khushalani, Kenmore, WA (US); Arijit Tarafdar, Sammamish, WA (US); Subramaniam Venkatraman Krishnan, Santa Clara, CA (US); Deepak Ravikumar, West Lafayette, IN (US); Andrew Francis Fogarty, New York, NY (US); Steve D Suh, Woodinville, WA (US); Yoonjae Park, Redmond, WA (US); Niharika Dutta, Redmond, WA (US); Santhosh Kumar Ravindran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 580 days.

(21) Appl. No.: 18/152,391

(22) Filed: Jan. 10, 2023

(65) Prior Publication Data

US 2024/0231927 A1     Jul. 11, 2024

(51) Int. Cl.
   *G06F 9/50*       (2006.01)
   *G06F 9/48*       (2006.01)
   *G06N 3/08*       (2023.01)

(52) U.S. Cl.
   CPC .............. *G06F 9/5038* (2013.01); *G06F 9/48* (2013.01); *G06F 9/4806* (2013.01);
   (Continued)

(58) Field of Classification Search
   CPC ........ G06F 9/48; G06F 9/4806; G06F 9/4843; G06F 9/4881; G06F 9/50; G06F 9/5005;
   (Continued)

(56) References Cited

U.S. PATENT DOCUMENTS 11,100,643 B2    8/2021   Yang
2018/0060132 A1*   3/2018   Maru .................... G06F 9/5055
                (Continued)

FOREIGN PATENT DOCUMENTS

WO     2022022571 A1    2/2022

OTHER PUBLICATIONS

Wang et al., "Elastic Parameter Server: Accelerating ML Training With Scalable Resource Scheduling", IEEE Transactions on Parallel and Distributed Systems, vol. 33, No. 5, May 2022, pp. 1128-1143 (Year: 2022).*

(Continued)

*Primary Examiner* — Charles M Swift
(74) *Attorney, Agent, or Firm* — ArentFox Schiff LLP

(57)        ABSTRACT

The present application relates to a network, apparatus, and method for allocating clusters of computing nodes for programming jobs. A network includes a plurality of datacenters including computing resources configurable to instantiate nodes for executing programming jobs on a cluster. The computing resources at one of the datacenters are configured to: provision a live pool including a number of clusters, each cluster in the live pool including a plurality of nodes imaged with a configuration for executing the programming jobs in parallel on the cluster; receive a request from a user to execute a programming job; allocate a cluster from the live pool to the user for the programming job when the cluster is available; evict the cluster from the live pool; and provision a new cluster within the live pool to meet the number of (Continued)

clusters. The number of clusters may be optimized based on linear programming and machine-learning.

17 Claims, 11 Drawing Sheets

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5061* (2013.01); *G06F 9/5077* (2013.01); *G06N 3/08* (2013.01)

(58) Field of Classification Search
CPC .... G06F 9/5027; G06F 9/5038; G06F 9/5061; G06F 9/5072; G06F 9/5077; G06N 3/08
See application file for complete search history.

(56) References Cited

U.S. PATENT DOCUMENTS

| | | | | |
|---|---|---|---|---|
| 2018/0060400 | A1* | 3/2018 | Wu | G06F 9/50 |
| 2020/0007418 | A1* | 1/2020 | Greenstein | G06F 9/5077 |
| 2023/0418672 | A1* | 12/2023 | Fried | G06F 9/44505 |

OTHER PUBLICATIONS

"Apache Flink", Retrieved From: https://flink.apache.org/, Retrieved Date: Nov. 19, 2022, 3 Pages.
"Apache Hive", Retrieved From: https://hive.apache.org/, Retrieved Date: Nov. 19, 2022, 2 Pages.
"Apache Livy", Retrieved From: https://livy.apache.org/, Retrieved Date: Nov. 19, 2022, 2 Pages.
"Apache Spark on Amazon EMR", Retrieved From: https://aws.amazon.com/emr/features/spark/, Retrieved Date: Nov. 19, 2022, 8 Pages.
"Apache Storm", Retrieved From: https://storm.apache.org/, Retrieved Date: Nov. 19, 2022, 4 Pages.
"Aws", Retrieved From: https://aws.amazon.com/, Retrieved Date: Nov. 19, 2022, 13 Pages.
"Azure Data Explorer—Kusto", Retrieved From: https://docs.microsoft.com/en-us/azure/data-explorer/kusto/query/, Jan. 24, 2023, pp. 1-3.
"Azure HDInsight", Retrieved From: microsoft.com/en-us/azure/hdinsight/spark/apache-spark-overview, Mar. 30, 2022, pp. 1-7.
"Azure Synapse", Retrieved From: https://docs.microsoft.com/en-us/azure/synapse-analytics/spark/apache-spark-overview, Dec. 7, 2022, pp. 1-5.
"Best Practices: Pools for Databricks", Retrieved From: https://docs.databricks.com/clusters/instance-pools/pool-best-practices.html, Nov. 29, 2021, pp. 1-5.
"GluonTS—Probabilistic Time Series Modeling in Python", Retrieved From: https://ts.gluon.ai/stable/, Retrieved Date: Nov. 19, 2022, 3 Pages.
"Google Cloud Platform", Retrieved from: https://cloud.google.com, Retreived Date: Nov. 19, 2022, pp. 1-13.
"Introduction to Cosmos DB", Retrieved From: https://docs.microsoft.com/en-us/azure/cosmos-db/introduction, Dec. 6, 2022, pp. 1-5.
"Microsoft Azure", Retrieved From: https://azure.microsoft.com, Retrieved Date: Nov. 19, 2022, pp. 1-7.
"NimbusMLbu", Retrieved From: https://docs.microsoft.com/en-us/nimbusml/overview, Oct. 14, 2022, pp. 1-2.
Ruan, et al., "Optimal Resource Provisioning Approach based on Cost Modeling for Spark Applications in Public Clouds", In Proceedings of the Doctoral Symposium of the 16th International Middleware Conference, Dec. 7, 2015, 4 Pages.
Zhang, et al., "Proactive VNF Provisioning with Multi-timescale Cloud Resources: Fusing Online Learning and Online Optimization", In Proceedings of IEEE Conference on Computer Communications, May 1, 2017, pp. 1-9.

"Prophet: Forecasting at Scale", Retrieved from: https://facebook.github.io/prophet/, Retrieved Date: Nov. 19, 2022, pp. 1-4.
"Serverless Spark", Retrieved From: https://cloud.google.com/dataproc-serverless/docs, Retreived Date: Nov. 19, 2022, pp. 1-3.
"Spark through Vertex AI", Retrieved from: https://cloud.google.com/vertex-ai-workbench, Retrieved Date: Nov. 19, 2022, pp. 1-8.
"Welcome To Apache ZooKeeper", Retrieved From: https://zookeeper.apache.org/, Retrieved Date: Nov. 19, 2022, 1 Pages.
Ahmed, et al., "Machine Learning at Microsoft With ML. Net", In Proceedings of the 25th ACM SIGKDD International Conference on Knowledge Discovery & Data Mining, Aug. 4, 2019, 11 Pages.
Aleksiyants, et al., "Implementing Apache Spark Jobs Execution and Apache Spark Cluster Creation for Openstack Sahara", In Journal of the Institute for System Programming of the RAS, vol. 27, Issue 5, 2015, pp. 35-48.
Baldan, et al., "A Forecasting Methodology for Workload Forecasting in Cloud Systems", In Journal of IEEE Transactions on Cloud Computing, vol. 6, Issue 4, Oct. 2016, pp. 929-941.
Baresi, et al., "Towards Vertically Scalable Spark Applications", In European Conference on Parallel Processing, Par of the Lecture Notes in Computer Science Book Series, Dec. 31, 2018, pp. 106-118.
Benifa, et al., "RLPAS: Reinforcement Learning-Based Proactive Auto-Scaler for Resource Provisioning in Cloud Environment", In Journal Mobile Networks and Applications, vol. 24, Issue 4, 2019, pp. 1348-1363.
Biswas, et al., "Automatic Resource Provisioning: A Machine Learning based Proactive Approach", In Proceedings of the IEEE 6th International Conference on Cloud Computing Technology and Science, 2014, pp. 168-173.
Lorido-Botran, et al., "A Review of Auto-scaling Techniques for Elastic Applications in Cloud Environments", In Journal of Grid Computing vol. 12, Issue 4, Oct. 11, 2014, pp. 559-592.
Bouabdallah, et al., "Use of Reactive and Proactive Elasticity to Adjust Resources Provisioning in the Cloud Provider", In Proceedings of the IEEE 18th International Conference on High Performance Computing and Communications, Dec. 12, 2016, pp. 1155-1162.
Chen, et al., "Cost-Effective Resource Provisioning for Spark Workloads", In Proceedings of the 28th ACM International Conference on Information and Knowledge Management, Nov. 3, 2019, pp. 2477-2480.
Dean, et al., "The Tail at Scale", In Journal Communications of the ACM, vol. 56, Issue 2, Feb. 1, 2013, pp. 74-80.
Dehoratius, et al., "Retail Inventory Management When Records are Inaccurate", In Journal of Manufacturing & Service Operations Management, vol. 10, Issue 2, Nov. 10, 2005, 35 Pages.
Fawaz, et al., "Inceptiontime: Finding Alexnet for Time Series Classification", In Journal of Data Mining and Knowledge Discovery, Sep. 7, 2020, pp. 1936-1962.
Golyandina, et al., "Basic Singular Spectrum Analysis and Forecasting with R", Retrieved from: https://www.researchgate.net/publication/228092069_Basic_Singular_Spectrum_Analysis_and_Forecasting_with_R, Mar. 2014, pp. 1-40.
Herbst, et al., "Self-Adaptive Workload Classification and Forecasting for Proactive Resource Provisioning", In Proceedings of the 4th ACM/SPEC International Conference on Performance Engineering, Apr. 21, 2013, pp. 187-198.
Khorsand, et al., "A Self-Learning Fuzzy Approach for Proactive Resource Provisioning in Cloud Environment", In Journal of Software: Practice and Experience vol. 49, Issue 11, Aug. 11, 2019, pp. 1618-1642.
Kleywegt, et al., "The Sample Average Approximation Method for Stochastic Discrete Optimization", In Journal of SIAM Journal on Optimization vol. 12, Issue 2, 2002, pp. 479-502.
Lee, Yi-H., "A Framework for Proactive Resource Provisioning in IaaS Clouds", In Journal of Applied Sciences vol. 7, Issue 8, Jul. 31, 2017, pp. 1-16.
Liu, et al., "Aggressive Resource Provisioning for Ensuring QoS in Virtualized Environments", In Proceedings of IEEE Transactions on Cloud Computing, vol. 3, Issue 2, Aug. 29, 2014, pp. 119-131.

(56) References Cited

OTHER PUBLICATIONS

Lu, et al., "Mechanisms and Architectures for Tail-Tolerant System Operations in Cloud", In Proceedings of the 6th USENIX conference on Hot Topics in Cloud Computing, Jun. 17, 2014, pp. 1-6.

Nghiem, et al., "Towards Efficient Resource Provisioning in MapReduce", In Journal of Parallel and Distributed Computing vol. 95, Sep. 2016, pp. 29-41.

Oh, et al., "A SLA-based Spark Cluster Scaling Method in Cloud Environment", In Proceedings of the Conference of 2016 18th Asia-Pacific Network Operations and Management Symposium, Oct. 7, 2016, pp. 1-4.

Poppe, et al., "Moneyball: Proactive Auto-Scaling in Microsoft Azure SQL Database Serverless", In Proceedings of the VLDB Endowment, vol. 15, Issue 6, 2020, pp. 1279-1287.

Poppe, et al., "Seagull: An Infrastructure for Load Prediction and Optimized Resource Allocation", In Proceedings of the VLDB Endowment, vol. 14, Issue 2, Sep. 27, 2020, pp. 154-162.

Rahman, et al., "Auto-Scaling VNFs Using Machine Learning to Improve QoS and Reduce Cost", In Proceedings of the 2018 IEEE International Conference on Communications, May 24, 2018, pp. 1-6.

Zaharia, et al., "Spark: Cluster Computing with Working Sets", In Proceedings of 2nd USENIX Workshop on Hot Topics in Cloud Computing, Jun. 22, 2010, pp. 1-7.

Thonglek, et al., "Auto-Scaling System in Apache Spark Cluster Using Model-Based Deep Reinforcement Learning", In Book of Heuristics for Optimization and Learning, Chapter 23, 2021, pp. 347-360.

Wang, et al., "Multilevel Wavelet Decomposition Network for Interpretable Time Series Analysis", In Proceedings of the 24th ACM SIGKDD International Conference on Knowledge Discovery & Data Mining, Jun. 23, 2018, pp. 2437-2446.

Wood, Timothy, "CloudNet: Dynamic Pooling of Cloud Resources by Live WAN Migration of Virtual Machines", In Journal ACM SIGPLAN Notices, vol. 46 Issue 7, Jul. 2011, pp. 121-132.

Zerveas, et al. "A Transformer-based Framework for Multivariate Time Series Representation Learning", In Proceedings of the 27th ACM SIGKDD Conference on Knowledge Discovery & Data Mining, Aug. 14, 2021, pp. 2114-2124.

Bae, et al., "Efficient Orchestration of Host and Remote Shared Memory for Memory Intensive Workloads", Proceedings Of The 31st Australian Conference on Human-Computer-Interaction, Sep. 28, 2020, pp. 194-208.

Gao, et al., "Deep Learning Workload Scheduling in GPU Datacenters: Taxonomy, Challenges and Vision", Cornell University Library, vol. 1, Issue No. 1, Jun. 1, 2022, pp. 1-35.

International Search Report and Written Opinion received for PCT Application No. PCT/US2023/086329, May 10, 2024, 14 pages.

Misra, et al., "RubberBand: Cloud-based Hyperparameter Tuning", Proceedings of The 27th Annual International Conference on Mobile Computing and Networking, Apr. 21, 2021, pp. 327-342.

Zhu, et al. "KEA: Tuning an Exabyte-Scale Data Infrastructure", In Proceedings of the 2021 International Conference on Management of Data, Jun. 21, 2021, 14 Pages.

International Preliminary Report on Patentability received for PCT Application No. PCT/US2023/086329, mailed on Jul. 24, 2025, 08 pages.

* cited by examiner

Figure 1

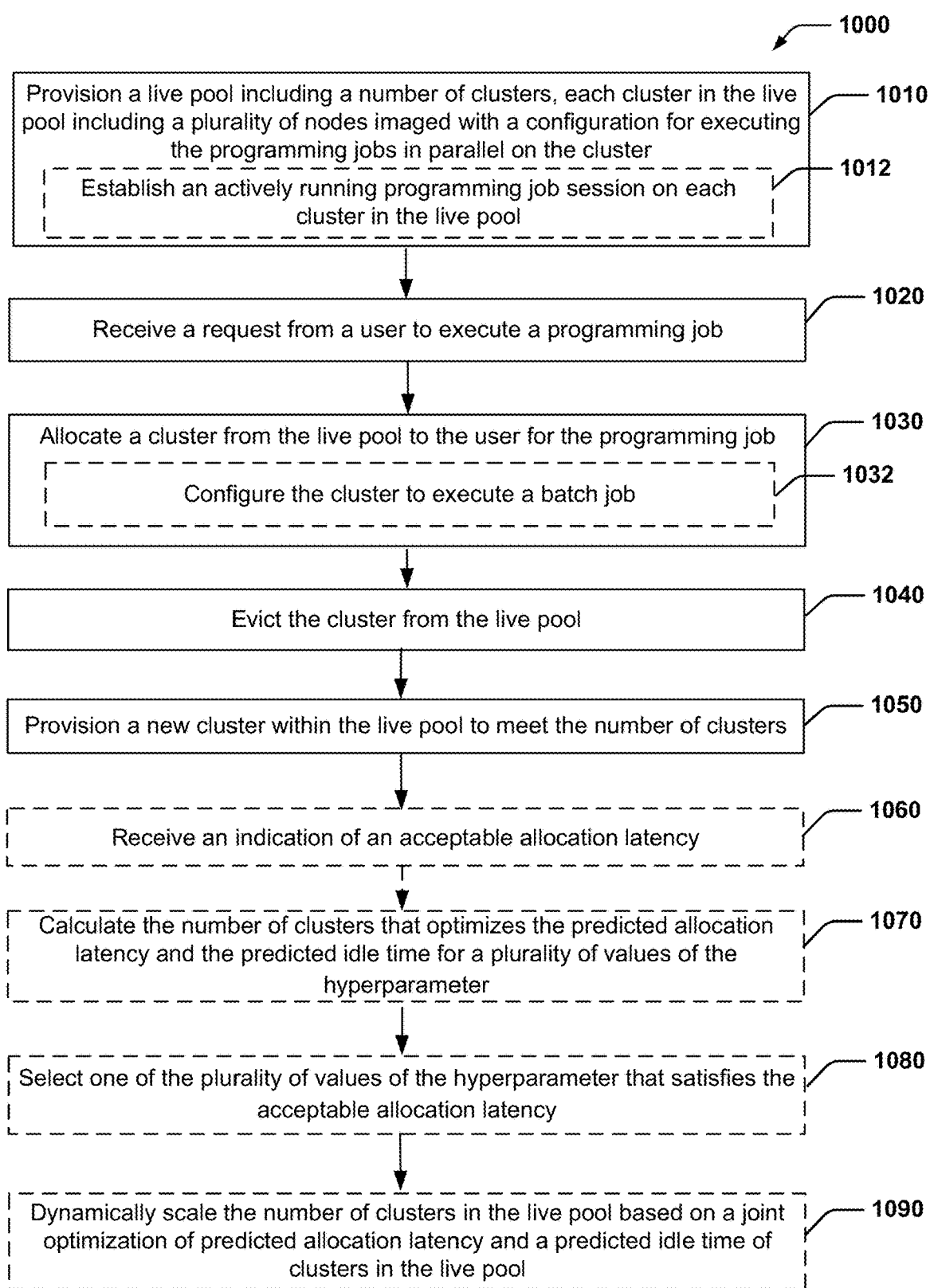

— 1000

Provision a live pool including a number of clusters, each cluster in the live pool including a plurality of nodes imaged with a configuration for executing the programming jobs in parallel on the cluster — 1010

Establish an actively running programming job session on each cluster in the live pool — 1012

Receive a request from a user to execute a programming job — 1020

Allocate a cluster from the live pool to the user for the programming job — 1030

Configure the cluster to execute a batch job — 1032

Evict the cluster from the live pool — 1040

Provision a new cluster within the live pool to meet the number of clusters — 1050

Receive an indication of an acceptable allocation latency — 1060

Calculate the number of clusters that optimizes the predicted allocation latency and the predicted idle time for a plurality of values of the hyperparameter — 1070

Select one of the plurality of values of the hyperparameter that satisfies the acceptable allocation latency — 1080

Dynamically scale the number of clusters in the live pool based on a joint optimization of predicted allocation latency and a predicted idle time of clusters in the live pool — 1090

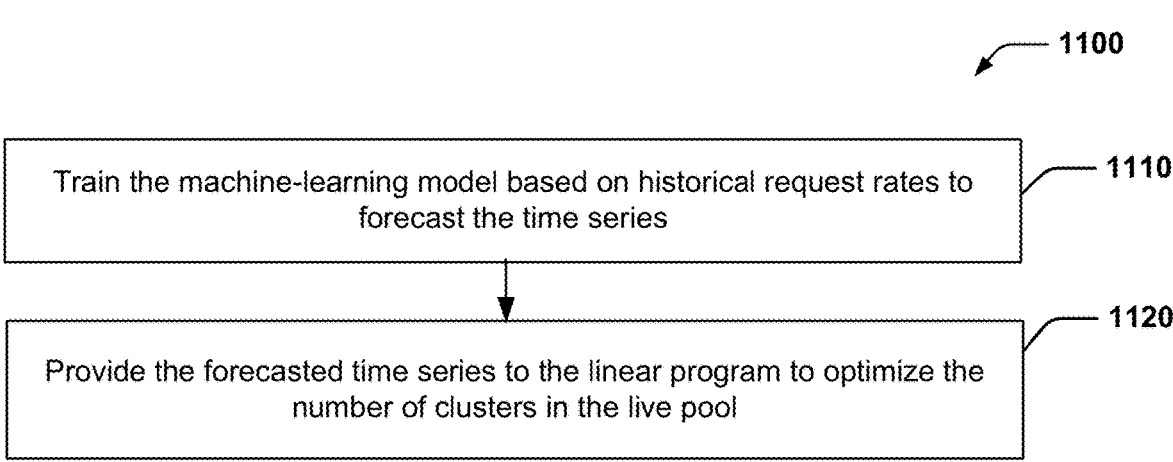

Train the machine-learning model based on historical request rates to forecast the time series — 1110

Provide the forecasted time series to the linear program to optimize the number of clusters in the live pool — 1120

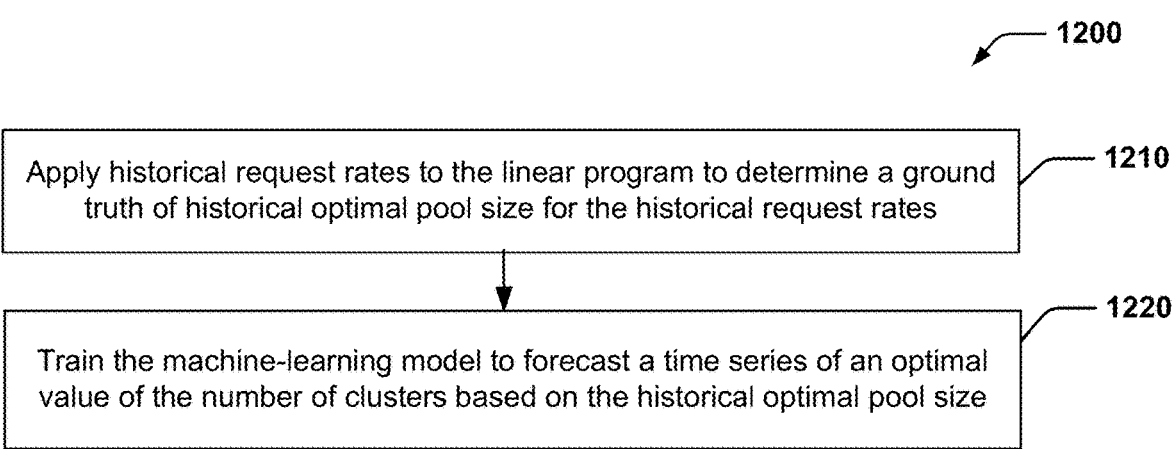

Apply historical request rates to the linear program to determine a ground truth of historical optimal pool size for the historical request rates — 1210

Train the machine-learning model to forecast a time series of an optimal value of the number of clusters based on the historical optimal pool size — 1220

Figure 12

PROACTIVE RESOURCE PROVISIONING IN LARGE-SCALE CLOUD SERVICE WITH INTELLIGENT POOLING

BACKGROUND

A cloud network may be implemented on a wide area network (WAN) that includes computing resources spread across a geographic region and connected via communication links such as fiber optic cables or satellite connectivity. A cloud provider may host cloud applications for its clients. For example, a cloud provider may provide infrastructure as a service (IaaS) services such as virtual machines (VM), platform as a service (PaaS) services such as databases and serverless computing, and software as a service (SaaS) services such as authentication platforms. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

Cloud computing has emerged as a top choice for executing big data analytic workloads in various business domains. To cope with rapidly-increasing demand, cloud vendors have funneled sizable resources into their own managed programming job services. For instance, Apache Spark is an example of a programming job service that executes on a coordinated cluster of virtual machines (VMs). Cloud vendors have implemented Spark services as IaaS, providing a cluster computing infrastructure to users. The flexibility of such cloud offerings allows users to easily lease and release compute resources and, consequently, enjoy potentially significant cost effectiveness. However, to provide such flexibility, service providers must address various challenges with respect to resource provisioning.

The complexity of such multi-tenancy and flexibility introduces a long latency to access clusters (due to resource pro-visioning, network configuring, authentication, imaging, etc.), impacting the Quality of Service (QoS). Even with significant effort to reduce the session preparation latency (such as starting jobs before all nodes are ready or introducing "healing" to initiate more VMs in case of long provisioning time), a long waiting time occurs between a user request and availability of the cluster. Observed cluster initialization time is typically greater than 60 seconds. This provisioning time can even be longer than the job execution time itself. Accordingly, there is a need to reduce the time that a customer waits for a cluster to be available for executing a programming job.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for provisioning resources for requests to execute programming jobs on a cluster of nodes, including: a memory storing computer-executable instructions; and at least one processor configured to execute the computer-executable instructions to: provision a live pool including a number of clusters, each cluster in the live pool including a plurality of nodes imaged with a configuration for executing the programming jobs in parallel on the cluster; receive a request from a user to execute a programming job; allocate a cluster from the live pool to the user for the programming job when the cluster is available; evict the cluster from the live pool; and provision a new cluster within the live pool to meet the number of clusters.

In some aspects, the techniques described herein relate to an apparatus, wherein the at least one processor is configured to execute the instructions to cause the apparatus to dynamically scale the number of clusters in the live pool based on a joint optimization of predicted allocation latency when no cluster is available and a predicted idle time of clusters in the live pool.

In some aspects, the techniques described herein relate to an apparatus, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

In some aspects, the techniques described herein relate to an apparatus, wherein the at least one processor is further configured to execute the instructions to cause the apparatus to: receive an indication of an acceptable allocation latency; calculate the number of clusters that optimizes the predicted allocation latency when no cluster is available and the predicted idle time for a plurality of values of the hyperparameter; and select one of the plurality of values of the hyperparameter that satisfies the acceptable allocation latency.

In some aspects, the techniques described herein relate to an apparatus, wherein the rate of requests from users is a predicted rate of requests for a time period based on a machine-learning model trained to forecast a time series.

In some aspects, the techniques described herein relate to an apparatus, wherein to dynamically scale the number of clusters, the at least one processor is configured to execute the instructions to cause the apparatus to: train the machine-learning model based on historical request rates to forecast the time series; and provide the forecasted time series to the linear program to optimize the number of clusters in the live pool.

In some aspects, the techniques described herein relate to an apparatus, wherein to dynamically scale the number of clusters, the at least one processor is configured to execute the instructions to cause the apparatus to: apply historical request rates to the linear program to determine a ground truth of historical optimal pool size for the historical request rates; and train the machine-learning model to forecast a time series of an optimal value of the number of clusters based on the historical optimal pool size.

In some aspects, the techniques described herein relate to an apparatus, wherein the machine-learning model is a hybrid model including a singular spectrum analysis (SSA) and a neural network with at least two layers.

In some aspects, the techniques described herein relate to an apparatus, wherein to provision the live pool, the at least one processor is configured to execute the instructions to cause the apparatus to establish an actively running programming job session on each cluster in the live pool.

In some aspects, the techniques described herein relate to an apparatus, wherein to allocate the cluster from the live pool to the user for the programming job, the at least one processor is configured to execute the instructions to cause the apparatus to configure the cluster to execute a batch job.

In some aspects, the techniques described herein relate to a method of provisioning resources for requests to execute programming jobs on a cluster of nodes, including: provisioning a live pool including a number of clusters, each cluster in the live pool including a plurality of nodes imaged with a configuration for executing the programming jobs in parallel on the cluster; receiving a request from a user to execute a programming job; allocating a cluster from the live pool to the user for the programming job when the cluster is available; evicting the cluster from the live pool; and provisioning a new cluster within the live pool to meet the number of clusters.

In some aspects, the techniques described herein relate to a method, further including dynamically scaling the number of clusters in the live pool based on a joint optimization of predicted allocation latency when no cluster is available and a predicted idle time of clusters in the live pool.

In some aspects, the techniques described herein relate to a method, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

In some aspects, the techniques described herein relate to a method, further including: receiving an indication of an acceptable allocation latency; calculating the number of clusters that optimizes the predicted allocation latency when no cluster is available and the predicted idle time for a plurality of values of the hyperparameter; and selecting one of the plurality of values of the hyperparameter that satisfies the acceptable allocation latency.

In some aspects, the techniques described herein relate to a method, wherein the rate of requests from users is a predicted rate of requests for a time period based on a machine-learning model trained to forecast a time series.

In some aspects, the techniques described herein relate to the method, wherein dynamically scaling the number of clusters includes: training the machine-learning model based on historical request rates to forecast the time series; and providing the forecasted time series to the linear program to optimize the number of clusters in the live pool.

In some aspects, the techniques described herein relate to a method, wherein dynamically scaling the number of clusters includes: applying historical request rates to the linear program to determine a ground truth of historical optimal pool size for the historical request rates; and training the machine-learning model to forecast a time series of an optimal value of the number of clusters based on the historical optimal pool size.

In some aspects, the techniques described herein relate to a method, wherein the machine-learning model is a hybrid model including a singular spectrum analysis (SSA) and a neural network with at least two layers.

In some aspects, the techniques described herein relate to a method, wherein provisioning the live pool includes establishing an actively running programming job session on each cluster in the live pool.

In some aspects, the techniques described herein relate to a method, wherein allocating the cluster from the live pool to the user for the programming job includes configuring the cluster to execute a batch job.

In some aspects, the techniques described herein relate to a wide area network, including: a plurality of datacenters, each datacenter including computing resources configurable to instantiate at least one node of a cluster for executing programming jobs on the cluster of nodes, wherein the computing resources at one or more of the plurality of datacenters are configured to: provision a live pool including a number of clusters, each cluster in the live pool including a plurality of nodes imaged with a configuration for executing the programming jobs in parallel on the cluster; receive a request from a user to execute a programming job; allocate a cluster from the live pool to the user for the programming job when the cluster is available; evict the cluster from the live pool; and provision a new cluster within the live pool to meet the number of clusters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Figure 1:
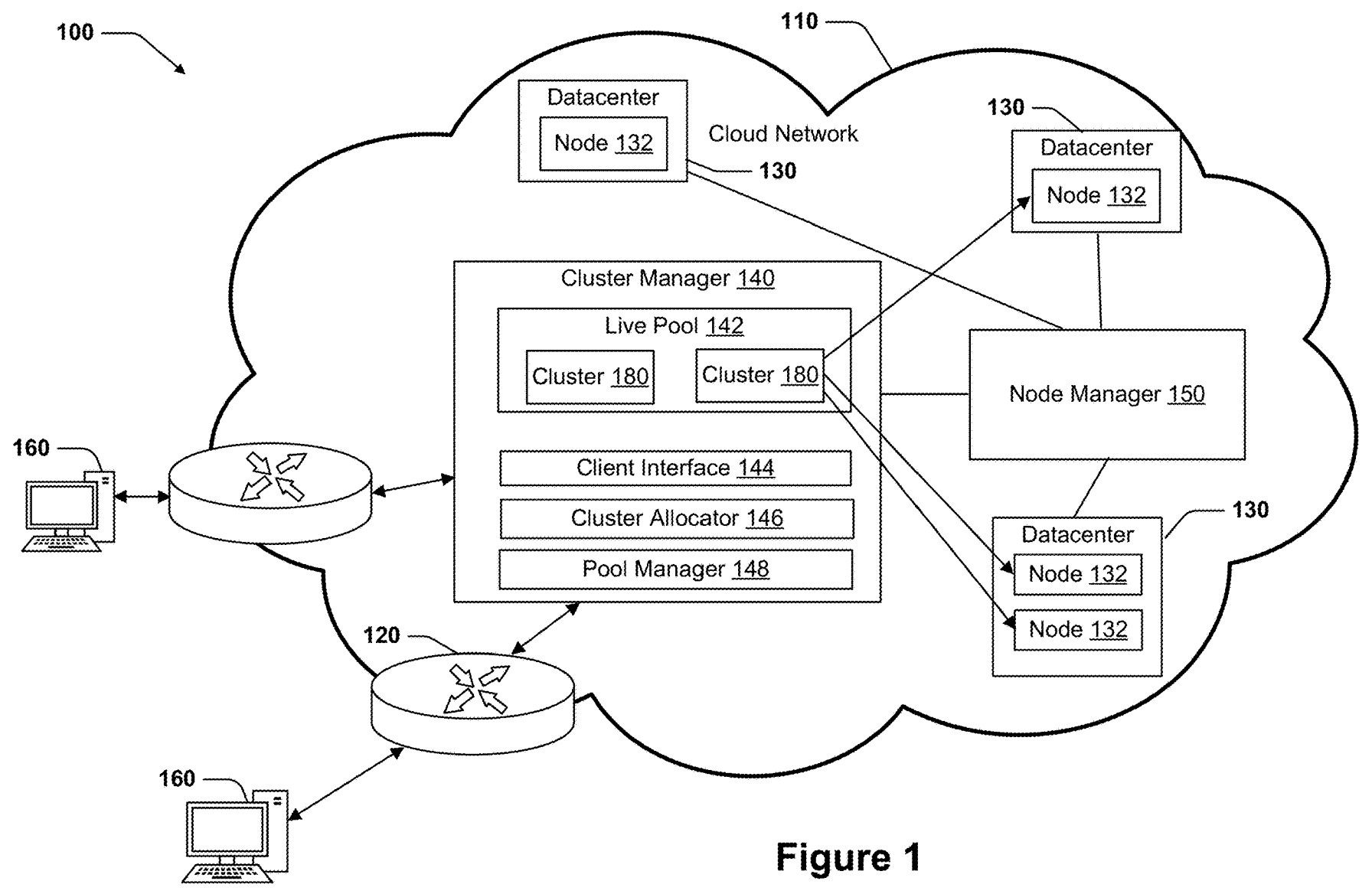

FIG. 1 is a diagram of an example of an architecture for provisioning resources for requests to execute programming jobs in a cloud network, in accordance with aspects described herein.

FIG. 10 is a flow diagram of an example method of allocating clusters for programming jobs in a cloud network, in accordance with aspects described herein.

FIG. 11 is a flow diagram of an example of a method of executing a two-step pipeline for optimizing a pool size, in accordance with aspects described herein.

FIG. 12 is a flow diagram of an example of a method of executing an end-to-end pipeline for optimizing a pool size, in accordance with aspects described herein.

FIG. 13 is a schematic diagram of an example of a device for performing functions of provisioning resources for

Figure 2:
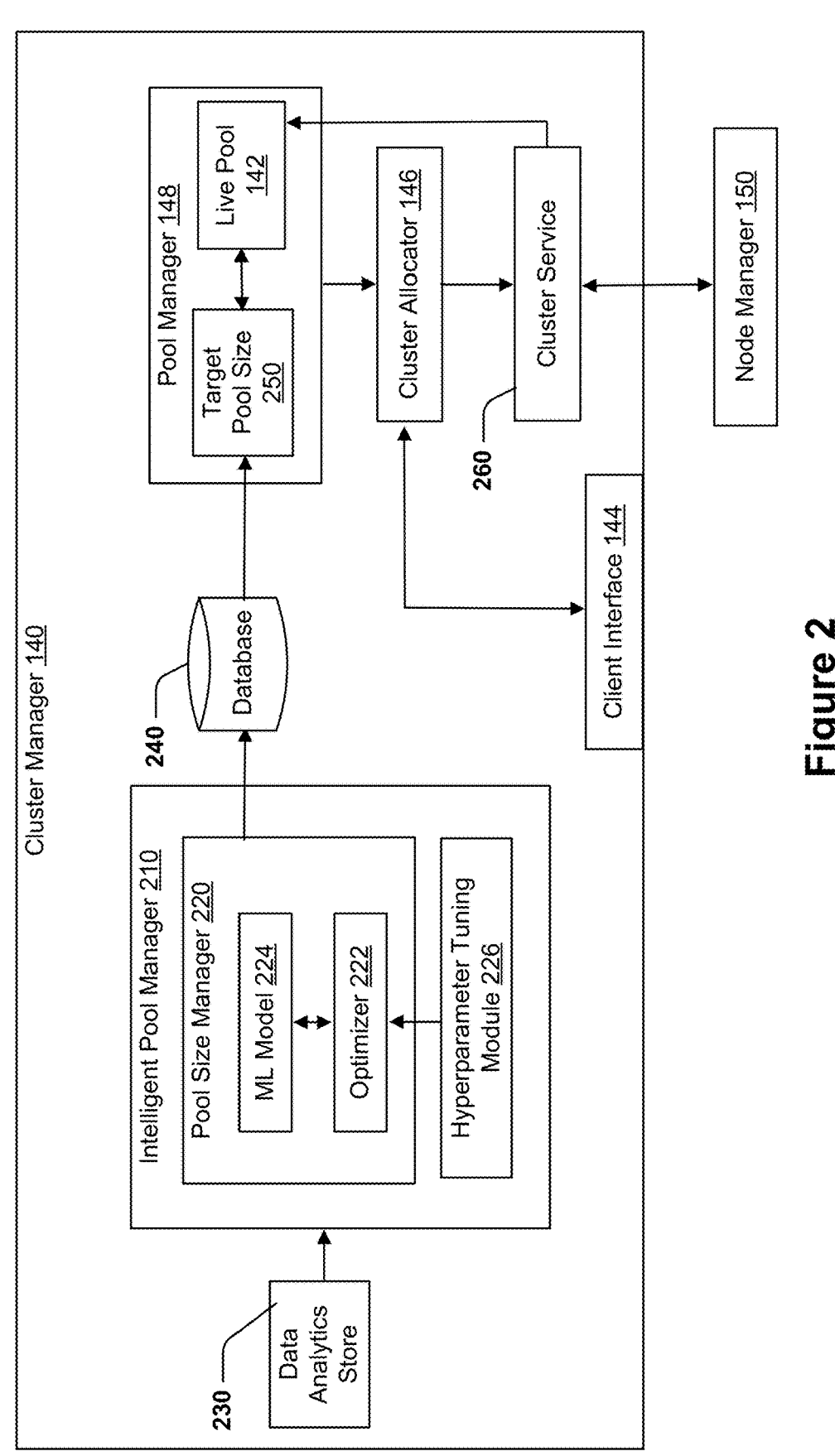
FIG. 2 is a diagram of an example of a cluster manager using a live pool of clusters to provision resources for requests to execute programming jobs in the cloud network, in accordance with aspects described herein.

5 requests to execute programming jobs in a cloud network, in accordance with aspects described herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to resource provisioning in large-scale cloud services with intelligent pooling. The cloud services may provide clusters of virtual machines for executing programming jobs, for example, according to a Spark framework. Conventionally, cloud services face a technical problem of quickly responding to user requests for clusters due to resource provisioning, network configuring, authentication, imaging, etc. Complexity in the underlying infrastructure can introduce a wide range of potential slowdowns that are difficult to detect, diagnose and mitigate. Some examples of this complexity include hardware heterogeneity, unreliable network communication, and intra-node service coordination. The typical process to initiate a programming job session on a cluster consists of 60-120 seconds for the cluster creation and 30-40 seconds for the session creation. Efforts are undergoing to reduce the tail latency of cluster initialization time, including making hedged requests and using tied requests. However, these approaches are not able to completely address the issue.

Further, the variance in demand due to uncertainty of user behavior further complicates resource management. When multiple users with variable demands share the same set of underlying compute resources, there can be unexpectedly low or high load at a given point in time, potentially leading to over-provisioning or throttling issues.

In an aspect, the present disclosure provides techniques for the cloud provider to employ properly-designed dynamic resource allocation to better manage operational costs of providing clusters for programming jobs executed by users. The operational costs include costs of the underlying computing hardware, electricity to power the computing hardware, and lost productivity when resources are unavailable. Any policy or control mechanism should both improve performance while reducing these costs. When operating at large scale, efficiency is paramount; small percentage cuts in costs convert to large savings.

Proactive auto-scaling has been introduced in data stream processing engines and network provisioning to address some of the above issues. The main goal of auto-scaling is to dynamically scale up (or down) the compute resources when the workload is heavy, and performance modeling is developed to ensure the QoS requirements are fulfilled. Time-series forecasting is used to determine the possible repeating patterns as inputs. The provisioning of clusters for programming jobs, however, faces additional technical challenges due to the goal of on-demand access to the cluster, but the relatively long provisioning time for the cluster. Additionally, demand (i.e., the number of requests for clusters) is highly elastic. Accordingly, there is no known automatic solution to manage cluster provisioning for customers.

In an aspect, this disclosure seeks to improve the customer experience of waiting for the initialization of clusters for programming job where a new cluster needs to be prepared for a newly submitted job, which is one of the major bottlenecks for many programming job systems. Compared to auto-scaling while the application is running, this problem can be more challenging because at the application submission time or even before (if supporting proactive provisioning), there can be little-to-no information known for a particular customer or application. Auto-scaling during the lifetime of an application may be useful for some jobs, but does not improve the initialization time experienced by the customer. Accordingly, this disclosure focuses on the initialization of resources (at the application startup time), and there can be a separate auto-scale service in charge of scaling up/down the compute cluster as well as the number of executors in real time based on the incoming workload characteristics, which include richer information about the application and the Service Level Agreements (SLAs) that need to be met.

Intuitively, a cluster provisioning system can provision a cluster in advance if one knows exactly when a customer will submit a job. However, it is intractable to predict individual user behavior effectively due to the high degree of uncertainty (e.g., when a new application will be submitted and what size of cluster is appropriate). Moreover, with a large volume of demand, having one model trained online per customer is not scalable. In tandem with the proactive provisioning mechanism, cluster provisioning system should model the performance observed by customers (for example the wait time for accessing a cluster) and estimate the extraneous costs from the point of view of the operator. Any over or under-provisioning will result in significant loss or unsatisfactory customer experiences. For a production system, a fully automated and robust solution is required. Moreover, the cluster provisioning system should be able to interact with an ever-changing environment based on the real-time state of the system (for example, if there are many cluster creation requests currently queued, the system should stop sending more of these requests, or if the cluster creation time is longer than expected, the provisioning policy should adapt accordingly). This requires the development and maintenance of a low-latency monitoring system and simple and efficient algorithms.

In an aspect, the present disclosure provides an apparatus, a wide-area network (WAN), and a method of provisioning resources for requests to execute programming jobs on a cluster of nodes. A live pool includes a number of clusters. Each cluster in the live pool includes a plurality of nodes imaged with a configuration for executing the programming jobs in parallel on the cluster. For example, the nodes may be virtual machines or other execution containers configured on computing resources at datacenters within the WAN. A cluster management service may be executed on other computing resources in the WAN. The cluster management service may receive a request from a user to execute a programming job. The cluster management service allocates a cluster from the live pool to the user for the programming job when the cluster is available. The cluster management service evicts the cluster from the live pool. The cluster management service provisions a new cluster within the live pool to meet the number of clusters. In some implementations, the cluster management service, or a separate pool management service, may dynamically scale the size of the pool based on a joint optimization of allocation latency when no cluster is available in the live pool to satisfy a user request and idle time of clusters in the pool.

Turning now to FIGS. 1-13, examples are depicted with reference to one or more components and one or more methods that may perform the actions or operations described herein, where components and/or actions/operations in dashed line may be optional. Although the operations described below in FIGS. 10-12 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a cloud network 110. The cloud network 110 may include computing resources that are controlled by a network operator and accessible to public clients 160. For example, the cloud network 110 may include a plurality of datacenters 130 that include computing resources such as computer memory and processors. In some implementations, the datacenters 130 may host a compute service that provides computing nodes 132 on computing resources located in the datacenter. The computing nodes 132 may be containerized execution environments with allocated computing resources. For example, the computing nodes 132 may be virtual machines (VMs), process-isolated containers, or kernel-isolated containers. The nodes 132 may be instantiated at a datacenter 130 and imaged with software (e.g., operating system and applications for a service). The cloud network 110 may include edge routers 120 that connect the datacenters 130 to external networks such as internet service providers (ISPs) or other autonomous systems (ASes) that form the Internet.

The cloud network 110 may provide a node manager 150 that provides nodes for various services. For example, the node manager 150 may select and allocate resources at various datacenters 130 to instantiate nodes 132. The node manager 150 may allocate the nodes to a particular service or user. A programming job such as a Spark job may be a particular type of job that executes on a cluster of nodes. Each node may be implemented as a VM. When generic job service requests a new cluster, e.g., in response to a user request, a cluster service waits to receive heartbeats from a minimum of three different nodes (provisioned as VMs) in the cloud network from the node manager 150. Once the minimum number of nodes is available, one of the VMs is assigned as the Livy node, which then triggers the configuration of the Node Agent, ZooKeeper service, Node certification manager and the Hive metastore, ultimately resulting in a successful cluster creation.

In an aspect, the cloud network 110 may include a cluster manager 140 configured to provision resources for requests to execute programming jobs on a cluster of virtual machines. The cluster manager 140 may include a live pool 142 including a number of clusters. Each cluster in the live pool includes a plurality of virtual machines imaged with a configuration for executing the programming jobs in parallel on the cluster. That is, the live pool 142 includes pre-provisioned clusters that can be allocated to users to provision a particular programming job. The pre-provisioning of the clusters can reduce the initialization time of the programming job for the user by eliminating the need to perform at least some of the provisioning steps after the request is received. Some further provisioning of the cluster may be needed depending on the type of programming job. The cluster manager 140 includes a client interface 144 configured to receive a request from a user to execute a programming job. The cluster manager 140 includes a cluster allocator 146 configured to allocate a cluster from the live pool to the user for the programming job. The cluster manager 140 includes a pool manager 148 configured to evict the cluster from the live pool and provision a new cluster within the live pool to meet the number of clusters.

In an aspect, the cluster manager 140 utilizes intelligent pooling, to proactively create clusters based on real-time monitoring of demand. The general idea of intelligent pooling is to dynamically determine the optimal number of resources in a pool and intelligently scale the size of the pool up or down as needed. A larger pool can lead to wasted costs (e.g., idle allocated resources) in a low demand scenario. On the other hand, a smaller pool has a higher likelihood of being drained out in high demand scenarios, where numerous customers need clusters or sessions at the same time and the system does not have enough time to sufficiently replenish the live pool 142. The client request in this situation must go through the original protracted startup process (referred to as "on-demand").

The cluster manager 140 includes a real-time monitoring system to constantly provide inputs to learn the optimal provisioning policy. Specifically, the cluster manager 140 collects telemetry data on the cluster creation request demand, the cluster initialization time, and the number of requests queued at the system level, and feeds this data along with system-level constraints into an algorithm.

The live pool 142 is where a number of clusters for programming jobs are proactively created and imaged for different users. Each time a user requests a cluster, one cluster will be immediately evicted from the live pool 142 and made available for usage. At the same time, a new cluster will be provisioned and added back to the live pool 142 such that the number of clusters in the pool will remain constant as the "inventory in stock." The process adding of provisioned clusters to the live pool 142 may be referred to as "re-hydration." In some implementations, the live pool 142 is categorized into two buckets: cluster pools and session pools. Both consist of pooled clusters; the difference is that session pools also have an actively-running programming job session in each cluster, which we call a pooled session. Session pools are useful for notebook scenarios, when a pre-created session can be used to run a notebook instantaneously. Cluster pools, by contrast, are useful for running batch jobs with pre-defined job definitions (e.g., a json file that describes a .jar file location, Spark configurations, etc.) and programming job sessions that require ad hoc customization. Similar to the concept of inventory management in retailing, the pool manager 148 may maintain a target number of resources in a given pool, and upon receiving a client request, a pre-provisioned resource can be used instantly. To maintain the target number of resources in the pool, the pool manager 148 sends a new request, referred to as a re-hydration request, to the cluster allocator 146 to add a new cluster or session back to the pool whenever a pooled resource is consumed or fails (due to exceeding a pre-defined lifespan or unexpected system failures).

In some implementations, the pool manager 148 includes a self-tuning system to dynamically learn the optimal pool size based on demand, considering the cost-performance tradeoffs. One of the biggest concerns of the live pool mechanism is the potentially huge costs of maintaining the idled clusters in the live pool 142. For a large-scale network, a live pool 142 with a fixed size may have greater than 10,000 CPU cores allocated to the live pool 142 that are idle. The pool manager 148 may dynamically tune the size of the live pool 142 according to customer demand so the pool can be re-hydrated intelligently, which would significantly reduce the cost compared to maintaining a static pool size. In some implementations, the pool manager 148 may include an efficient linear programming (LP) solution to model the two factors of waiting time and idle time based on the Pareto frontier, which can be solved within seconds to obtain the optimal pool size by time of day. Moreover, the pool manager 148 may be a self-adaptive system for automatically tuning the penalty of the high costs versus long cluster waiting time to ensure a proper balance of the trade-off between high cost and better performance.

In some implementations, the pool manager 148 includes a hybrid time-series forecasting algorithm of the future demand at the aggregate level with high accuracy and fast training time. Based on both the historic demand as well as the latest observation of the cluster creation request rate, the time-series forecasting models predict the future demand (measured by the cluster request rate) that is used as input to the optimization model. The end-to-end training time is reduced to seconds, which allows for fast updating of the model. The cluster manager 140 may be integrated with other cloud service management tools for efficient deployment of a cluster provisioning system.

FIG. 2 is a diagram 200 of an example of the cluster manager 140 using a live pool 142 of clusters to provision resources for requests to execute programming jobs in the cloud network. The cluster manager 140 includes an intelligent pool manager 210 configured to dynamically scale the number of clusters in the live pool 142 based on a joint optimization of predicted allocation latency and a predicted idle time of clusters in the live pool. live pool. The pool manager 148 then maintains the number of clusters at a target pool size 250. The cluster manager 140 follows three system-level constraints: (1) To avoid throttling issues, the live pool 142 should not submit a large number of requests in a short period of time; and (2) the pool size should not be updated too frequently because this can result in the possible cancellation of cluster creation requests (in the case of decreasing pool size), which might not be cost-effective or feasible considering potential network latencies; (3) there should be a way to set a minimum and maximum for the target pool size 250 to act as guardrails to ensure the live pool 142 is not over- or under-hydrated. Further the cluster manager 140 is designed to be simple and maintainable, fast and adaptive to the real-time system status, and able to scale up to a large number of regions and potentially multiple pools with different cluster configurations (e.g., number of nodes, VM types, etc.).

The intelligent pool manager 210 includes a pool size manager 220 configured to output the target pool size 250 for various times. The pool size manager 220 is a pipeline of two main modules: an optimizer 222 and a machine-learning (ML) model. The optimizer 222 may be a Sample Average Approximation (SAA) Optimizer that formulates a simple linear programming problem to optimize the pool size based on input demand, which can either be historic or predicted by the ML model 224. The optimized results (e.g., target pool size 250 for periods of time) are then saved as configuration files in a database 240. The ML model 224 may be an ML predictor configured to make real-time predictions for the future demand (e.g., rate of requests for clusters) by constantly fetching historic observations from the data analytics store 230. As discussed in further detail below, multiple ML algorithms may be used as an ML predictor with various degrees of both accuracy and latency requirements. The pool size manager 220 may operate as a pipe with the optimizer 222 and the ML model 224 in either order. In a 2-step pipeline, the ML model 224 is trained on the input cluster request rate data. The ML model 224 predicts cluster request data, which is then fed to the optimizer 222 which outputs the predicted optimal pool size. In an end-to-end pipeline, the SAA optimizer is applied on the historic data, providing a ground truth optimal pool size for the past. The historic optimal pool size is then used to train the ML model 224, which predicts the optimal pool size for the future.

The intelligent pool manager 210 may leverage the existing infrastructure used by live pools 142 for its own execution and deployment. The cluster allocator 146 is responsible for orchestrating batch programming jobs and interactive sessions; providing APIs to perform create, read, update and delete (CRUD) operations on programming jobs; and managing and processing programming job-related metadata. A cluster service 260 is responsible for requesting nodes from the node manager 150 and "stitching" them to form clusters; providing APIs to perform CRUD operations on clusters; and managing and processing cluster-related metadata. The pool manager 148 is responsible for maintaining the target pool size 250 by invoking the cluster allocator 146 to create and delete resources and, if applicable, fetching the latest pool size recommendation file from the database 240.

In some implementations, the cluster manager 140 may be implemented as a work item service on the cloud network 110. The work item service is a background service that supports various workloads, including but not limited to cluster and session pooling, programming job submissions, and the intelligent pool manager 210. The work item service is responsible for monitoring available work items that represent these workloads and spinning up worker processes that execute the workloads.

In some implementations, the intelligent pool manager 210 includes a hyperparameter tuning module 226. The hyperparameter tuning module 226 is configured to periodically fine-tune the hyperparameters for the optimization algorithm to ensure the cluster manager 140 is not over-allocating or under-allocating resources. For example, in some implementations, the hyperparameter tuning module 226 may tune the hyperparameter to provide a requested allocation latency at a lowest cost. The hyperparameter tuning module 226 may be configured to receive an indication of an acceptable allocation latency (e.g., from client interface 144). The hyperparameter tuning module 226 may be configured to calculate the number of clusters that optimizes the predicted allocation latency when no cluster is available and the predicted idle time for a plurality of values of the hyperparameter. The hyperparameter tuning module 226 may be configured to select one of the plurality of values of the hyperparameter that satisfies the acceptable allocation latency. The hyperparameter tuning module can be executed at a lower frequency while the pool size manager 220 runs at a higher frequency such that pool size manager 220 captures the rapid change of the environment and adapts faster to the demand.

Figure 3:
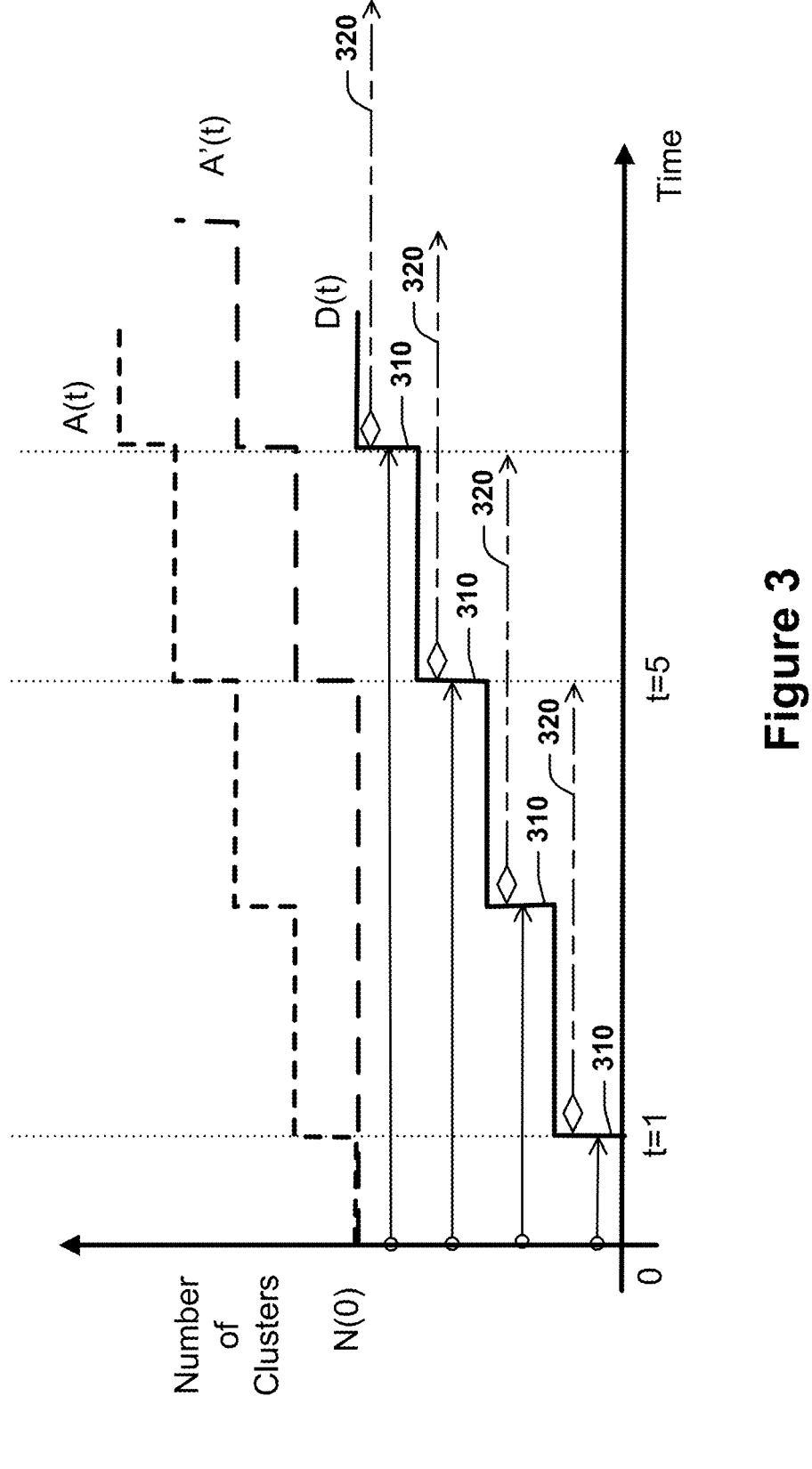
FIG. 3 is a chart showing cumulative cluster creation, cumulative pool rehydration, number of ready clusters, and pool size over time for an example use scenario, in accordance with aspects described herein.

FIG. 3 is a chart 300 showing cumulative cluster creation, cumulative pool rehydration, number of ready clusters, and pool size over time for an example use scenario. These factors affect the wait time and idle time of the live pool 142. As illustrated in FIG. 3, D(t) is the cumulative number of clusters requested by customers (demand); N(t) is the target pool size 250 as a function of time; A(t) is the cumulative number of cluster re-hydration requests made to add a cluster to the live pool 142 in order to keep it at the target pool size of N(t); τ is the cluster initialization time, i.e., the time lag before a cluster can be ready for use after the creation or rehydration request is sent; A'(t) is the cumulative number of clusters ready for use.

For instance, at time t=0, a live pool 142 is created with N(0)=4 clusters, and whenever a user request 310 for a new cluster is received, a cluster will be emitted from the live pool 142 to be used by the customer. At the same time, the pool manager 148 will initiate a re-hydration request 320 to cluster allocator 146 to add a new cluster back to the live pool 142. Therefore, whenever a new request 310 is made (corresponding to an increase in D(t)), the pool manager 148 will make a re-hydration request 320 to add a cluster back to the live pool 142 (corresponding to an increase in A(t)). As a result, the curve of A(t) can be seen as a simple "shift-up" of the curve of D(t), and the gap between them equals the target pool size N(t). Similarly, because cluster creations take time, the cumulative number of clusters that are ready to use, A'(t), is a "shift-right" of the number of requests made, A(t), by the cluster creation latency, r. These properties can be stated symbolically:

$$A(t) = D(t) + N(t), \forall\, t \qquad (1)$$

$$A'(t) = A(t - \tau), \forall\, t \geq \tau \qquad (2)$$

$$A'(t) = N(0), \forall\, t < \tau \qquad (3)$$

Assuming a first-come-first-serve rule, the clusters in the live pool 142 will be acquired by customers based on the user request arrival time. For instance, in FIG. 3, the first four clusters in the pool will be used by the first four requests 310 that are received. The fifth created cluster is triggered by the arrival of the request at t=1, and is not ready until t=5. The fifth created cluster will be used by the fifth request (not shown) received in the future.

Figure 4:
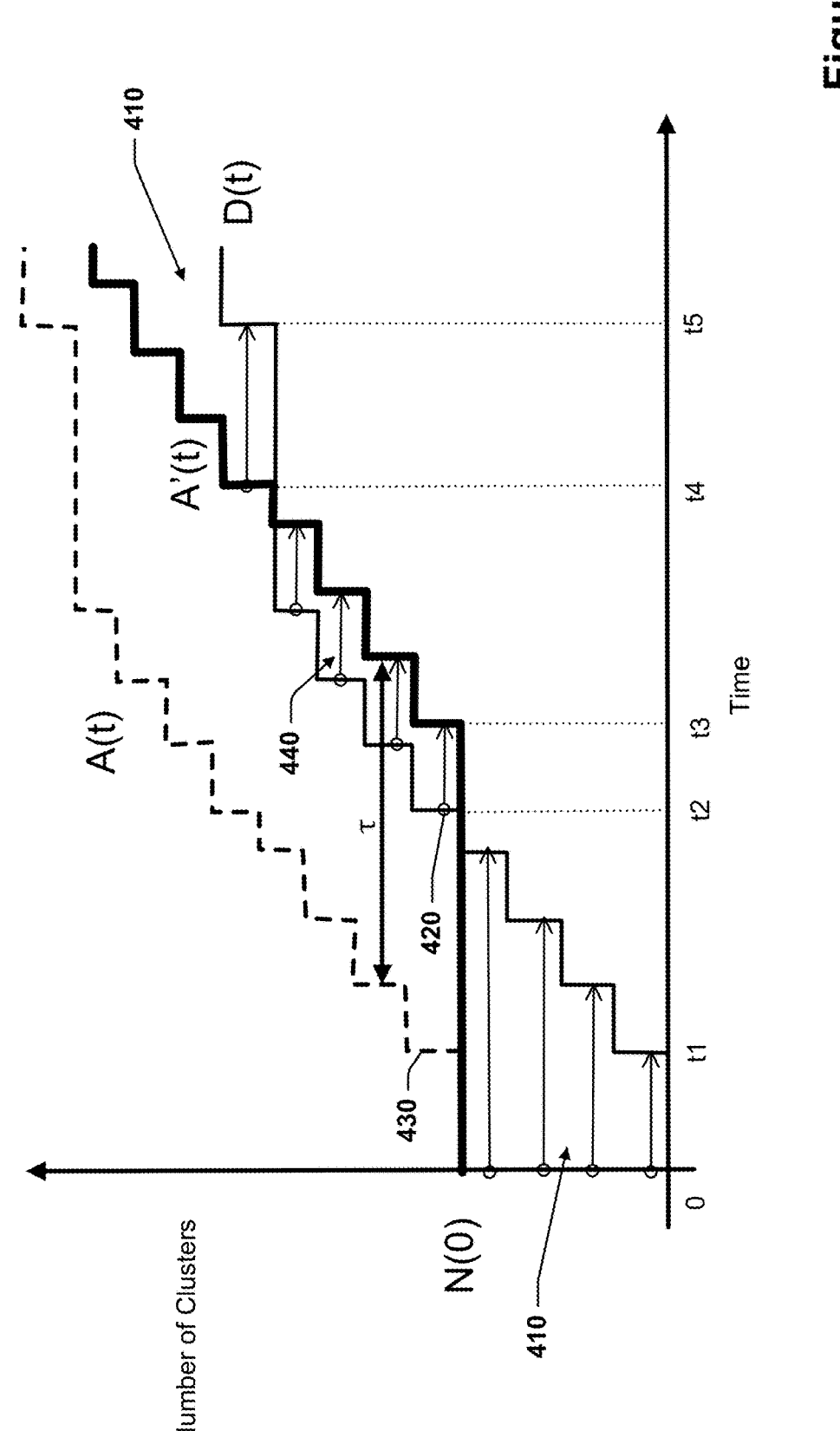
FIG. 4 is a chart showing wait time for clusters and idle time of clusters in the live pool, in accordance with aspects described herein.

FIG. 4 is a chart 400 showing wait time for clusters and idle time of clusters in the live pool, in accordance with aspects described herein. The optimizer 222 may optimize for two factors: the total idle time pooled clusters are alive and unused by customers; and the total wait time for customers (when the pool is drained out and the customer must wait for the full cluster startup duration). The optimizer 22 may attempt to minimize each of these factors based on a hyperparameter that weights the allocation latency and/or the idle time of clusters in the live pool.

In FIG. 4, there is a one-to-one mapping between a created cluster and the request that will use the corresponding cluster based on a first-come-first-serve (FCFS) rule. Whenever A'(t)>D(t), idle time occurs, and whenever A'(t) <D(t), wait time occurs. For example, at time t=0, four clusters have been created, and they will be used by the first four requests that come in. For those clusters, their aggregate idle time equals the area 410 between the curves of A'(t) and D(t). However, the fifth cluster creation request 430 on curve A(t) was not ready until t3 while the fifth customer request 420 on curve D(t) occurs at t2. Therefore, for the fifth request, the customer has to wait for t3−t2, and the wait time is the area 440 between the curves D(t) and A'(t). Similarly, there is a weight time for the sixth, seventh and eighth requests. At the end, the demand (request rate) decreased starting with the ninth request at t5, and the live pool 142 has recovered. The A'(t) becomes larger than D(t) again. And the clusters after being ready will be idled again till the next request comes in (on the A(t) curve, the last request will be idled for t5−t4, during another idle time shown as another area 410).

In sum, the total wait time of customers is the area 440 where A'(t)<D(t), and the total idle time of clusters in the pool is the area 410 where A'(t)>D(t). With this, the intelligent pool manager 210 can estimate the optimal pool size where both the total wait time and the idle time are minimized. And specifically, the optimizer 222 can leverage linear programming with minimization as the objective to calculate the areas:

$$\Delta^+(t) \geq A'(t) - D(t), \forall\, t \qquad (4)$$

$$\Delta^+(t) \geq 0, \forall\, t \qquad (5)$$

$$\Delta^-(t) \geq D(t) - A'(t), \forall\, t \qquad (6)$$

$$\Delta^-(t) \geq 0, \forall\, t \qquad (7)$$

If the objective function involves minimizing $\Delta^+(t)$ and $A^-(t)$, one can prove that in the optimal solution, if A'(t)≥D (t), $\Delta^+(t) = \Delta'(t) - D(t)$ and $\Delta^-(t) = 0$. If A'(t)≤D(t), $\Delta^-(t) = D(t) - A'(t)$ and $\Delta^+(t) = 0$. And the sum of $\Delta^+$ and $\Delta^-$ calculates the total area 410 (idle time) and area 440 (wait time) respectively. And the constraints are all linear.

Figure 5:
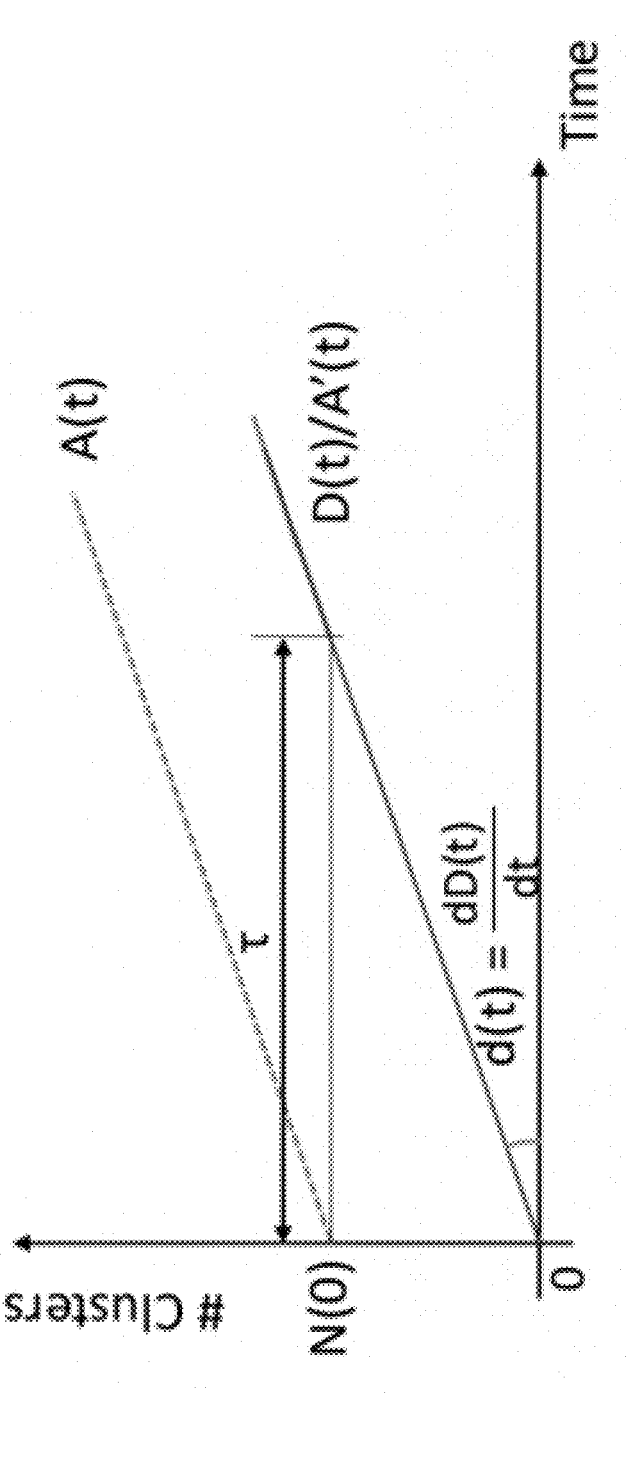
FIG. 5 is a chart showing a simplified solution for determining a dynamic pool size, in accordance with aspects described herein.

FIG. 5 is a chart 500 showing a simplified solution for determining a dynamic pool size. A simple calculation for the optimal pool size is: d(t)·τ, where d(t) is the number of clusters created per minute, and z is the initialization time in minutes. In FIG. 5, in the triangle, if the pool size N equals the number of clusters requested during the initialization time d(t)·τ, the curve of Δ'(t) after shifting from A(t)=D(t)+ N(t) by τ, will perfectly overlap with D(t) and both the idle time and wait time will be zero. Accordingly, the simplified solution provides a simple approximation for the optimal pool size. If the cluster creation time is long or the demand is high, the pool size manager 220 should create a larger pool.

In some implementations, the optimizer 222 is an optimization program with the objective to minimize the total cost (considered as a weighted sum of the wait time and idle time). The optimizer 222 may use the sample average approximation (SAA) method based on the input demand data to minimize the expected total cost over the whole observed period. The optimization problem can be formulated as:

$$\min \alpha \cdot \text{Total Idle Time} + \beta \cdot \text{Total Wait Time}, \qquad (8)$$

where α and β are the hyperparameters representing the penalty of having long idle time versus wait time. A larger α will result in an optimal solution trying to minimize the idle time more than wait time, and vice versa. By changing the hyperparameter values, one can achieve a full Pareto curve of the trade-off between idle time and wait time. The optimizer 222 may be expressed symbolically as:

$$\min \alpha \cdot \Sigma_t \Delta^+(t) + \beta \cdot \Sigma_t \Delta^-(t) \qquad (9)$$

subject to equations (1)-(7) above.

With this minimization formulation, for the optimal solution, $\Delta^+(t)$ equals the number of idle clusters at time, and $\Delta^-(t)$ equals the queued demand. All the constraints are linear. For the maximum number of requests made, there can be an additional constraint on the maximum number of requests per time interval, MAX NEW REQUEST:

$$N(t) - N(t-1) \leq \text{MAX NEW REQUEST}, \forall \geq 1. \quad (10)$$

Additional constraints based on the design considerations discussed above may include:

$$\text{MIN POOL SIZE} \leq N(t) \leq \text{MAX POOL SIZE}, \forall t \geq 1 \quad (11)$$

$$N(t) = N(\lfloor t/\text{STABLENESS}\rfloor * \text{STABLENESS})\forall t \geq 1 \quad (12)$$

Constraint (11) sets the minimum and maximum pool size (i.e., MIN POOL SIZE and MAX POOL SIZE), and constraint (12) ensures that the pool size is stable for $\Delta t$=STABLENESS time intervals. For simplicity at the implementation level, additional constraints may be added to ensure that the pool size for the same day of week or time of day is the same for a more static controlling policy. Note that all the constraints are still linear and can be solved by commercial solvers with low latency.

The ML model 224 may utilize various models for time series prediction. Four example models, each representing a different category/approach are: (1) Singular Spectrum Analysis (SSA) implemented by ML.NET; (2) Inception Time; (3) TST; and (4) mWDN. These models are specifically chosen since each represents a different category: SSA is a traditional ML-based approach, TST is a transformer-based deep learning approach, mWDN is wavelet decomposition-based approach and Inception Time is a 1D convolution model.

The ML model 224 may be trained using an 80-20 train-test split. Specifically, for the deep learning models, the training set may be further split into a 90-10 train-validation set. The validation set may ensure against overfitting to the training set and may trigger an early stop. A modified loss function may directly embed the estimation of the wait-idle time trade-off into the training process. For example, the modified loss function may be similar to the estimation of $\Delta^+$ and A− as in Equations 4-7, which is a proxy of the true wait and idle time. The loss function $\mathcal{L}$ may be defined as:

$$L = \alpha' \cdot \delta^+ + (1 - \alpha') \cdot \delta^- \quad (13)$$

$$\delta = y - \hat{y} \quad (14)$$

$$\delta^+ = \delta: \delta > 0 \quad (15)$$

$$\delta^- = -\delta: \delta < 0 \quad (16)$$

where y is the ground truth time series, $\hat{y}$ is the predicted output and $\alpha'$ is the hyper-parameter that controls the relative importance of idle time and wait time during optimization and training. The modified loss function in Equation 13 allows for the models to perform better at the extremes of the wait time and idle time constraints.

The rate at which the update the ML model 224 is updated has a big impact on the idle time (i.e. cost savings). Thus, models that are fast to update are advantageous. Deep models (mWDN, TST and Inception Time) are relatively slow to train and update compared to SSA. However, SSA failed to achieve sufficiently low wait times in some cases. To address these two limitations, a new hybrid model may combine the best of both worlds.

The goal with the hybrid model is to achieve low training latency and relatively good trade-off performance. To achieve this, the issues with SSA and the deep models are addressed by combining certain parts of each. The reason SSA fails to achieve low wait times is because there is no way to specify and control how much the predicted request rate must overshoot the ground truth. If the predicted usage/pool size is larger than ground truth, this will result in a larger pool size, lowering the average wait time. With deep models, the overshoot is controlled using the loss function defined by Equation 13. However, the issue with deep models is that the models are too computation-intensive for the task at hand and need lots of data and computational resources to train the over-parameterized model. Thus, the proposed hybrid model includes an SSA forecaster followed by a shallow two-layer neural net ($\approx$30 parameters, with ReLU activation for non-linearity) which acts as an error predictor. This error predictor can be trained using the loss from Equation 13 to learn the overshoot or undershoot needed to achieve the target wait time.

Constantly adapting the hyper-parameters to meet business needs is a challenge and adds to the cost of maintaining the service. Particularly, the cluster manager 140 should achieve a service-level agreement on the performance (wait time) while minimizing the idle versus wait time penalty. Thus, a self-adaptive hyper-parameter tuning mechanism may be used to close the feedback loop. The hyperparameter tuning module 226 may monitor the system behavior (pool hit and pool misses) and adjust for the parameters accordingly such that the pool size manager 220 can always maintain the optimal balance as desired. To achieve this, the $\beta$ hyper parameter can be eliminated from Equation 9 and the objective function can rewritten as:

$$\min \alpha' \cdot \Sigma_t \Delta^+(t) + (1 - \alpha') \cdot \Sigma_t \Delta^-(t), \quad (17)$$

where $0 \leq \alpha' \leq 1$, which is equivalent to equation (9).

Thus the hyperparameter tuning module 226 may have one hyper-parameter to tune, which reduces the search space. The relation between the customer wait time (wait) and the hyper-parameter a' can be modeled by approximating the relation $\alpha'$=(wait) to be linear. And with this approximation, the hyperparameter tuning module 226 may try to fit the best line based on the previous 10 data-points and update the value iteratively.

Figures 6, 7:
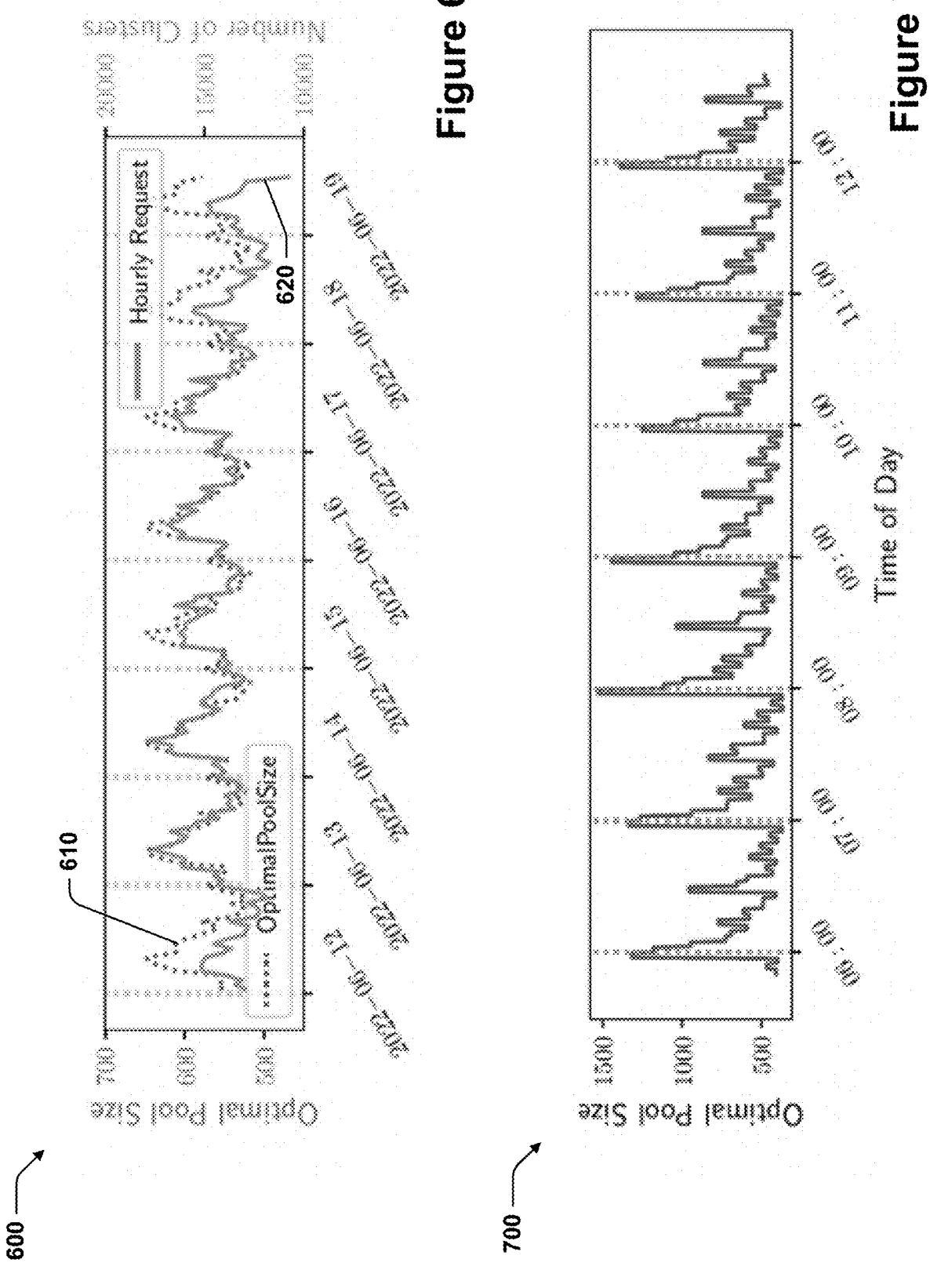
FIG. 6 is a chart showing optimal pool size over time with a variable rate of requests for clusters, in accordance with aspects described herein.
FIG. 7 is a chart showing optimal pool size based on time of day, in accordance with aspects described herein.

FIG. 6 is a chart 600 showing optimal pool size 610 over time with a variable rate of requests 620 for clusters. The rate of requests 620 is extracted from a commercial programming job service with hundreds of thousands of cluster requests. Assuming that one pool will serve all the cluster requests, the optimal pool size 610 can be estimated by time of day and type of day (weekday versus weekend) using historic data. The optimal pool size 610 is correlated with the number of requests 620. The optimal pool size 610 increases right before the peaks (demand surge) in the number of requests 620.

FIG. 7 is a chart 700 showing optimal pool size based on time of day. In FIG. 7, the optimal pool size increases 5 minutes before the start of every hour that is, 5:55, 6:55, 7:55, etc. This is due to the fact that many jobs are scheduled at 6 AM, 7 AM, etc. The optimization proactively prepares for this surge by increasing the pool size to cope with this demand.

There is a trade-off between longer wait time and longer idle time. As discussed previously, a larger pool size generally results in longer idle times and a decrease in the likelihood of the pool being drained out. The hyperparameter tuning module 226 can tune the value of the cost penalty in the objective function, i.e. $\alpha$ and $\beta$, to tune the pool size.

Figure 8:
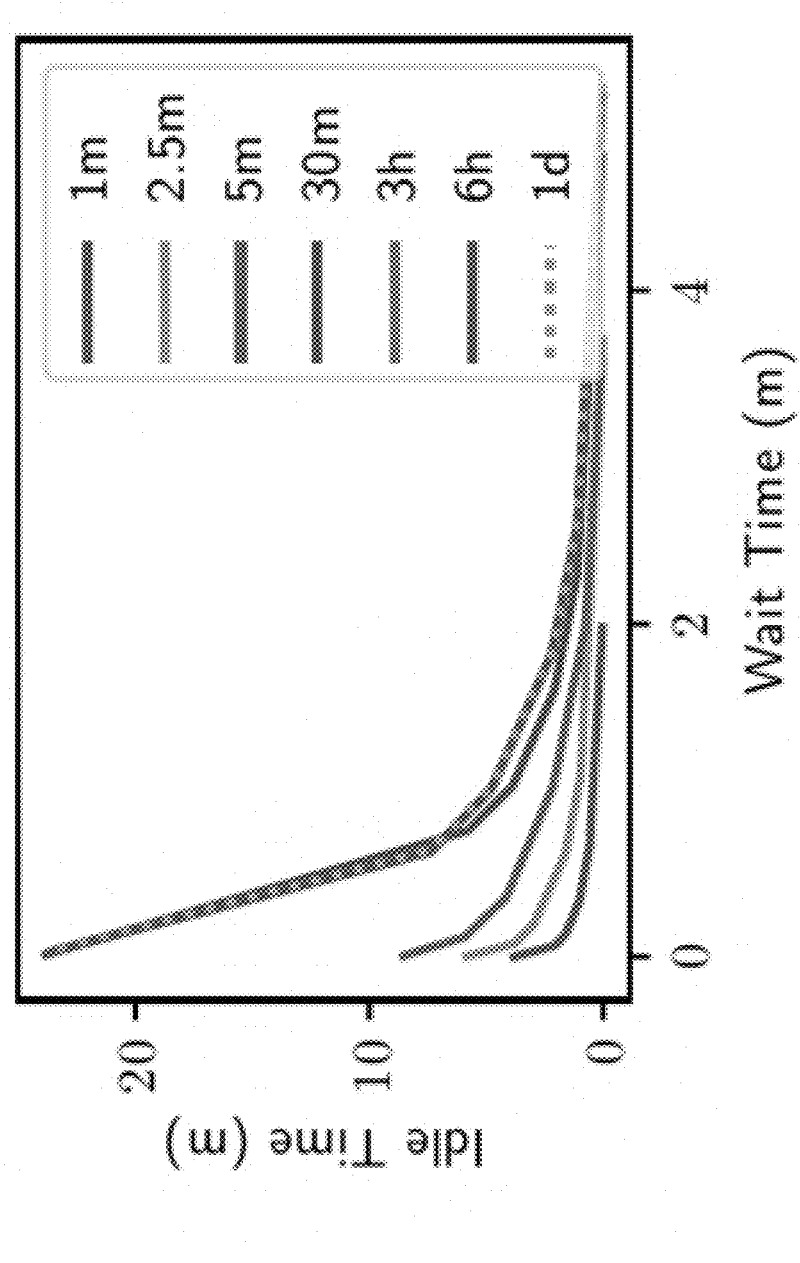
FIG. 8 is a chart showing Pareto optimal frontiers for wait time and idle time at various intervals for updating the pool size, in accordance with aspects described herein.

FIG. 8 is a chart 800 showing Pareto optimal frontiers for wait time and idle time at various intervals for updating the pool size. The frequency in which the pool size is updated can impact the performance. For example, the cluster manager 140 cannot capture intra-day changes in demand if there is a constant pool size for the whole day (1440 minutes between updates), whereas if the pool size manager 220 can update the pool size more dynamically, the cluster manager 140 can act on changes in demand on-the-fly (e.g., 1 minute update interval).

Further the Pareto curve for the 2-step approach (predict future demand with ML model 224, and then apply SAA optimizer 222 to the prediction) is different than the E2E pipeline (apply SAA optimizer 222 to historic demand for historic optimal pool size, and then use ML model 224 to forecast). The improvement in idle time of the ML models over a baseline increases as lower and lower wait times are targeted. However, this improvement is up to a certain point, after which the difference in idle time reduces as the wait time approaches zero. SSA-based models fail to achieve very low wait times (e.g., <5) for both the 2-step and the E2E approach. However, for the mWDN model, by tuning the custom loss function (Equation 13), the hyperparameter tuning module 226 is able to further increase the penalty for long wait times. This suggests that the SSA model is not suited for targeting low wait times. While an end-to-end pipeline has better prediction performance to predict optimal pool size directly, the trade-off curve suggests 2-step performs better overall. Targeting 99% pool hit rate (the percentage of cluster requests experiencing 0 wait time), the system achieves up to 43% reduction in idle time compared to static pooling. Accordingly, the cost savings due to the reduction in idle time depend on the pool hit rate of the SLA and the performance of the selected model, with the hybrid model providing the best performance.

Additionally, the training time of the ML models using different data sizes may vary. The hybrid model built on top of SSA has a slightly increased training time compared to SSA, but it is still extremely fast compared to the pure deep learning model (mWDN). Accordingly, the hybrid model provides similar performance as mWDN with significantly reduced latency.

Figure 9:
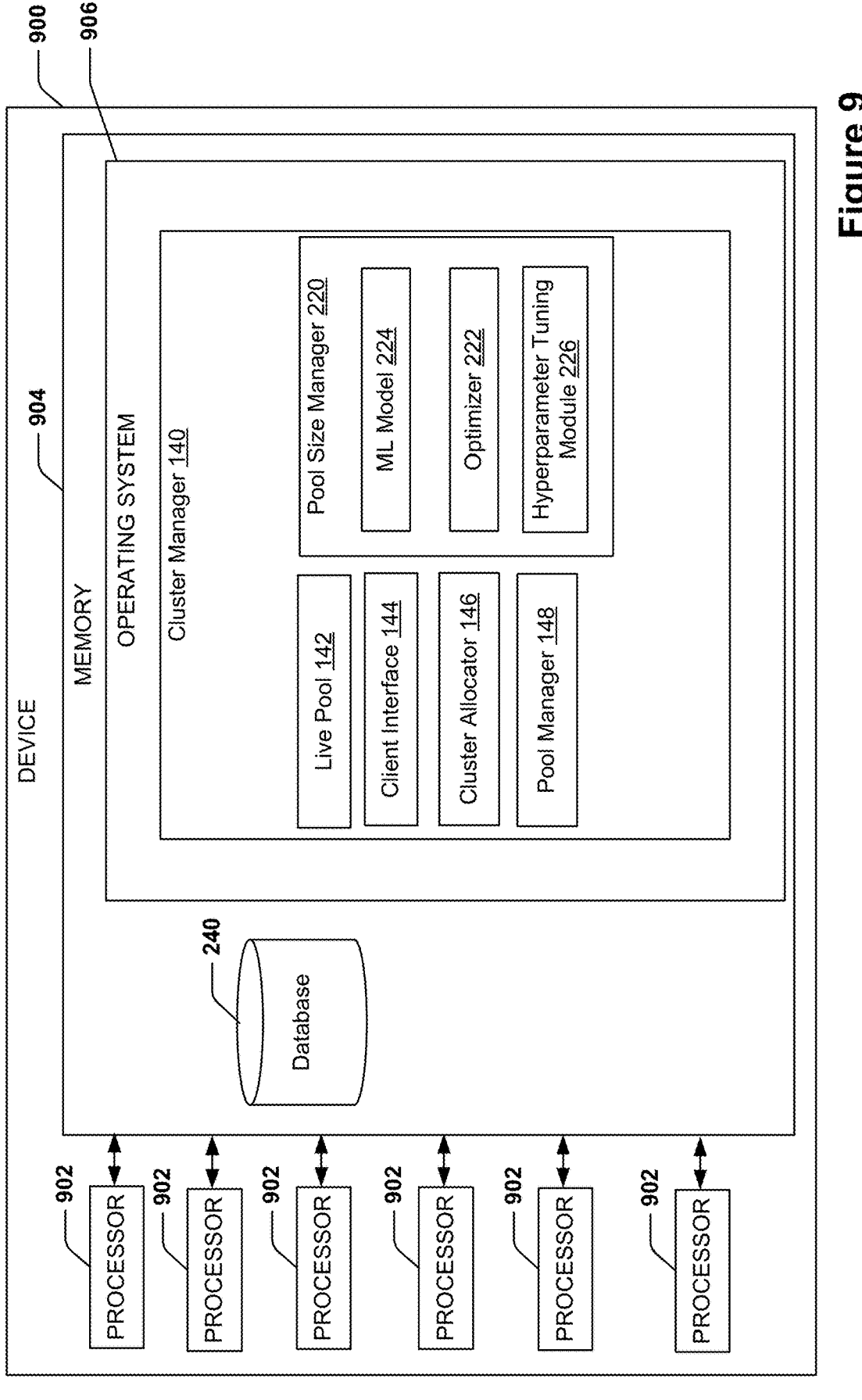
FIG. 9 is a schematic diagram of an example of a device for allocating clusters for programming jobs in a cloud network, in accordance with aspects described herein.

FIG. 9 is a schematic diagram of an example of an apparatus 900 (e.g., a computing device) for managing ingress traffic. The apparatus 900 may be implemented as one or more computing devices in the cloud network 110.

In an example, the apparatus 900 includes at least one processor 902 and a memory 904 configured to execute or store instructions or other parameters related to providing an operating system 906, which can execute one or more applications or processes, such as, but not limited to, the cluster manager 140. For example, processors 902 and memory 904 may be separate components communicatively coupled by a bus (e.g., on a motherboard or other portion of a computing device, on an integrated circuit, such as a system on a chip (SoC), etc.), components integrated within one another (e.g., a processor 902 can include the memory 904 as an on-board component), and/or the like. Memory 904 may store instructions, parameters, data structures, etc. for use/execution by processor 902 to perform functions described herein. In some implementations, the memory 904 includes the database 240 for use by the cluster manager 140.

In an example, the cluster manager 140 includes the live pool 142, the client interface 144, the cluster allocator 146, the pool manager 148, and the pool size manager 220. The pool size manager 220 may include the ML model 224, the optimizer 222, and the hyperparameter tuning module 226.

In some implementations, the apparatus 900 is implemented as a distributed processing system, for example, with multiple processors 902 and memories 904 distributed across physical systems such as servers, virtual machines, or datacenters 130. For example, one or more of the components of the cluster manager 140 may be implemented as services executing at different datacenters 130. The services may communicate via an application programming interface (API). In some implementations, the data analytics store 230, cluster service 260, and/or node manager 150 may be part of the distributed processing system and may execute at the same or different datacenters 130.

FIG. 10 is a flow diagram of an example of a method 1000 for executing programming jobs on a cluster of virtual machines. For example, the method 1000 can be performed by the cluster manager 140, the apparatus 900 and/or one or more components thereof to execute programming jobs on clusters of nodes 132 in the cloud network 110.

At block 1010, the method 1000 includes provisioning a live pool including a number of clusters, each cluster in the live pool including a plurality of nodes imaged with a configuration for executing the programming jobs in parallel on the cluster. In an example, the cluster manager 140, e.g., in conjunction with processor 902, memory 904, and operating system 906, can provision the live pool 142 including the number of clusters (e.g., the target pool size 250). Each cluster 180 in the live pool 142 includes a plurality of nodes 132 imaged with a configuration for executing the programming jobs in parallel on the cluster 180. For example, the nodes 132 may be virtual machines or execution containers that are allocated computing resources from a datacenter. In some implementations, at sub-block 1012, the block 1010 may optionally include establishing an actively running programming job session on each cluster in the live pool. For example, when the live pool 142 is a session pool, the clusters 180 may be configured with an actively running programming job session prior to being allocated to a user.

At block 1020, the method 1000 includes receiving a request from a user to execute a programming job. In an example, the client interface 144, e.g., in conjunction with processor 902, memory 904, and operating system 906, can receive a request from a user (e.g., client 160) to execute a programming job. For instance, the programming job may be a request for a Spark session or a Spark batch job.

At block 1030, the method 1000 includes allocating a cluster from the live pool to the user for the programming job when the cluster is available. In an example, the cluster allocator 146, e.g., in conjunction with processor 902, memory 904, and operating system 906, can allocate a cluster 180 from the live pool 142 to the user (e.g., client 160) for the programming job when the cluster is available. For instance, the cluster allocator 146 may provide an address of the cluster 180 to the client 160. When a cluster is available in the live pool 142 at the time of the request from the user, the cluster may be allocated with no allocation latency. In some cases, the live pool 142 may not have any available clusters, in which case the allocation to the user may wait until a cluster becomes available in the live pool 142. The system may incur allocation latency while waiting for a cluster to become available to the live pool. In some implementation, at sub-block 1032, the block 1030 may optionally include configuring the cluster to execute a batch job. For example, the cluster allocator 146 may further configure the cluster 180 for the batch job based on a job definition in a json file.

At block 1040, the method 1000 includes evicting the cluster from the live pool. In an example, the cluster allocator 146, e.g., in conjunction with processor 902, memory 904, and operating system 906, can the evict the cluster from the live pool. For instance, the cluster allocator 146 may delete an address of the cluster 180 from the live pool 142 such that the cluster 180 will not be allocated to a different user.

At block 1050, the method 1000 includes provisioning a new cluster within the live pool to meet the number of clusters. In an example, the pool manager 148, e.g., in conjunction with processor 902, memory 904, and operating system 906, can provision the new cluster 180 within the live pool 142 to meet the number of clusters (e.g., the target pool size 250). For instance, the pool manager 148 may request the new cluster 180 via the cluster allocator 146, which requests the new cluster 180 from the cluster service 260 and the node manager 150.

At block 1060, the method 1000 may optionally include receiving an indication of an acceptable allocation latency. In an example, the client interface 144, e.g., in conjunction with processor 902, memory 904, and operating system 906, can receive the indication of the acceptable allocation latency. For instance, the client interface 144 may receive an SLA from the client 160 and provide the acceptable allocation latency to the hyperparameter tuning module 226.

At block 1070, the method 1000 may optionally include calculating the number of clusters that optimizes the predicted allocation latency and the predicted idle time for a plurality of values of the hyperparameter. In an example, the hyperparameter tuning module 226, e.g., in conjunction with processor 902, memory 904, and operating system 906, can calculate the number of clusters that optimizes the predicted allocation latency and the predicted idle time for a plurality of values of the hyperparameter. For instance, the hyperparameter tuning module 226 may execute the pool size manager 220 with each of the values of the hyperparameter.

At block 1080, the method 1000 may optionally include selecting one of the plurality of values of the hyperparameter that satisfies the acceptable allocation latency. In an example, the hyperparameter tuning module 226, e.g., in conjunction with processor 902, memory 904, and operating system 906, can select one of the plurality of values of the hyperparameter that satisfies the acceptable allocation latency. For instance, the hyperparameter tuning module 226 may select the value of the hyperparameter where the pool hit rate is greater than 99% or an average predicted wait time satisfies the SLA.

At block 1090, the method 1000 may optionally include dynamically scaling the number of clusters in the live pool based on a joint optimization of predicted allocation latency and a predicted idle time of clusters in the live pool. In an example, the pool size manager 220, e.g., in conjunction with processor 902, memory 904, and operating system 906, can dynamically scale the number of clusters 180 in the live pool 142 based on a joint optimization of predicted allocation latency and a predicted idle time of clusters in the live pool. For instance, the pool size manager 220 may execute the optimizer 222 and the ML model 224 as either a two-step or E2E pipeline that outputs a target pool size 250 for different periods of time.

FIG. 11 is a flow diagram of an example of a method 1100 for executing a two-step pipeline. For example, the method 1100 can be performed by the pool size manager 220, the apparatus 900 and/or one or more components thereof. The method 1100 may be an example of block 1090 of method 1000.

At block 1110, the method 1100 includes training the machine-learning model based on historical request rates to forecast the time series. In an example, the pool size manager 220 may train the ML model 224 based on historical request rates to forecast the time series.

At block 1120, the method 1100 includes providing the forecasted time series to the linear program to optimize the number of clusters in the live pool. In an example, the pool size manager 220 and/or the ML model 224 may provide the forecasted time series to the optimizer 222 to optimize the number of clusters in the live pool 142.

FIG. 12 is a flow diagram of an example of a method 12 for executing a E2E pipeline. For example, the method 1200 can be performed by the pool size manager 220, the apparatus 900 and/or one or more components thereof. The method 1200 may be an example of block 1090 of method 1000.

At block 1210, the method 1200 includes applying historical request rates to the linear program to determine a ground truth of historical optimal pool size for the historical request rates. In an example, the pool size manager 220 may apply historical request rates to the optimizer 222 to determine a ground truth of historical optimal pool size for the historical request rates.

At block 1220, the method 1200 includes training the machine-learning model to forecast a time series of an optimal value of the number of clusters based on the historical optimal pool size. In an example, the pool size manager 220 may train the ML model 224 to forecast a time series of an optimal value of the number of clusters based on the historical optimal pool size.

Figure 13:
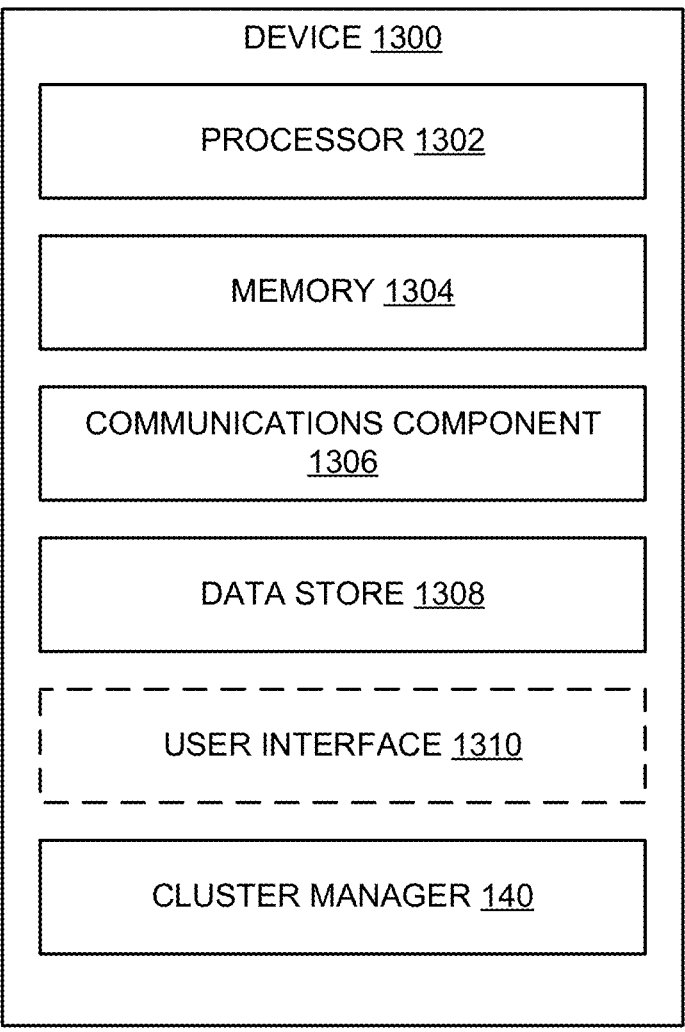

FIG. 13 illustrates an example of a device 1300 including additional optional component details as those shown in FIG. 9. In one aspect, device 1300 includes processor 1302, which may be similar to processor 1302 for carrying out processing functions associated with one or more of components and functions described herein. Processor 1302 can include a single or multiple set of processors or multi-core processors. Moreover, processor 1302 can be implemented as an integrated processing system and/or a distributed processing system.

Device 1300 further includes memory 1304, which may be similar to memory 904 such as for storing local versions of operating systems (or components thereof) and/or applications being executed by processor 902, such as the cluster manager 140, the pool size manager 220, the node manager 150, etc. Memory 1304 can include a type of memory usable by a computer, such as random access memory (RAM), read only memory (ROM), tapes, magnetic discs, optical discs, volatile memory, non-volatile memory, and any combination thereof. The processor 1302 may execute instructions stored on the memory 1304 to cause the device 1300 to perform the methods discussed above with respect to FIGS. 10-12.

Further, device 1300 includes a communications component 1306 that provides for establishing and maintaining communications with one or more other devices, parties, entities, etc. utilizing hardware, software, and services as described herein. Communications component 1306 carries communications between components on device 1300, as well as between device 1300 and external devices, such as devices located across a communications network and/or devices serially or locally connected to device 1300. For example, communications component 1306 may include one or more buses, and may further include transmit chain components and receive chain components associated with a wireless or wired transmitter and receiver, respectively, operable for interfacing with external devices.

Additionally, device 1300 may include a data store 1308, which can be any suitable combination of hardware and/or software, that provides for mass storage of information, databases, and programs employed in connection with aspects described herein. For example, data store 1308 may be or may include a data repository for operating systems (or components thereof), applications, related parameters, etc. not currently being executed by processor 1302. In addition, data store 1308 may be a data repository for the cluster manager 140.

Device 1300 may optionally include a user interface component 1310 operable to receive inputs from a user of device 1300 and further operable to generate outputs for presentation to the user. User interface component 1310 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 1310 may include one or more output devices, including but not limited to a display, a speaker, a haptic feedback mechanism, a printer, any other mechanism capable of presenting an output to a user, or any combination thereof.

Device 1300 additionally includes the cluster manager 140 for provisioning resources for requests to execute programming jobs on a cluster 180 of nodes 132; pool manager 148 for provisioning a live pool including a number of clusters and for provisioning a new cluster within the live pool to meet the number of clusters; client interface 144 for receiving a request from a user to execute a programming job; cluster allocator 146 for allocating a cluster from the live pool to the user for the programming job and for evicting the cluster from the live pool, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus for provisioning resources for requests to execute programming jobs on a cluster of nodes, comprising: a memory storing computer-executable instructions; and at least one processor configured to execute the computer-executable instructions to: provision a live pool including a number of clusters, each cluster in the live pool including a plurality of nodes imaged with a configuration for executing the programming jobs in parallel on the cluster; receive a request from a user to execute a programming job; allocate a cluster from the live pool to the user for the programming job when the cluster is available; evict the cluster from the live pool; and provision a new cluster within the live pool to meet the number of clusters.

Clause 2. The apparatus of clause 1, wherein the at least one processor is configured to execute the instructions to cause the apparatus to dynamically scale the number of clusters in the live pool based on a joint optimization of predicted allocation latency when no cluster is available and a predicted idle time of clusters in the live pool.

Clause 3. The apparatus of clause 2, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

Clause 4. The apparatus of clause 3, wherein the at least one processor is further configured to execute the instructions to cause the apparatus to: receive an indication of an acceptable allocation latency; calculate the number of clusters that optimizes the predicted allocation latency when no cluster is available and the predicted idle time for a plurality of values of the hyperparameter; and select one of the plurality of values of the hyperparameter that satisfies the acceptable allocation latency.

Clause 5. The apparatus of clause 3 or 4, wherein the rate of requests from users is a predicted rate of requests for a time period based on a machine-learning model trained to forecast a time series.

Clause 6. The apparatus of clause 5, wherein to dynamically scale the number of clusters, the at least one processor is configured to execute the instructions to cause the apparatus to: train the machine-learning model based on historical request rates to forecast the time series; and provide the forecasted time series to the linear program to optimize the number of clusters in the live pool.

Clause 7. The apparatus of clause 5, wherein to dynamically scale the number of clusters, the at least one processor is configured to execute the instructions to cause the apparatus to: apply historical request rates to the linear program to determine a ground truth of historical optimal pool size for the historical request rates; and train the machine-learning model to forecast a time series of an optimal value of the number of clusters based on the historical optimal pool size.

Clause 8. The apparatus of any of clauses 5-7, wherein the machine-learning model is a hybrid model including a singular spectrum analysis (SSA) and a neural network with at least two layers.

Clause 9. The apparatus of any of clauses 1-8, wherein to provision the live pool, the at least one processor is configured to execute the instructions to cause the apparatus to establish an actively running programming job session on each cluster in the live pool.

Clause 10. The apparatus of any of clauses 1-8, wherein to allocate the cluster from the live pool to the user for the programming job, the at least one processor is configured to execute the instructions to cause the apparatus to configure the cluster to execute a batch job.

Clause 11. A method of provisioning resources for requests to execute programming jobs on a cluster of nodes, comprising: provisioning a live pool including a number of clusters, each cluster in the live pool including a plurality of nodes imaged with a configuration for executing the programming jobs in parallel on the cluster; receiving a request from a user to execute a programming job; allocating a cluster from the live pool to the user for the programming job when the cluster is available; evicting the cluster from the live pool; and provisioning a new cluster within the live pool to meet the number of clusters.

Clause 12. The method of clause 11, further comprising dynamically scaling the number of clusters in the live pool based on a joint optimization of predicted allocation latency when no cluster is available and a predicted idle time of clusters in the live pool.

Clause 13. The method of clause 12, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

Clause 14. The method of clause 13, further comprising: receiving an indication of an acceptable allocation latency; calculating the number of clusters that optimizes the predicted allocation latency when no cluster is available and the predicted idle time for a plurality of values of the hyperparameter; and selecting one of the plurality of values of the hyperparameter that satisfies the acceptable allocation latency.

Clause 15. The method of clause 13 or 14, wherein the rate of requests from users is a predicted rate of requests for a time period based on a machine-learning model trained to forecast a time series.

Clause 16. The method of clause 15, wherein dynamically scaling the number of clusters comprises: training the machine-learning model based on historical request rates to forecast the time series; and providing the forecasted time series to the linear program to optimize the number of clusters in the live pool.

Clause 17. The method of clause 15, wherein dynamically scaling the number of clusters comprises: applying historical request rates to the linear program to determine a ground truth of historical optimal pool size for the historical request rates; and training the machine-learning model to forecast a time series of an optimal value of the number of clusters based on the historical optimal pool size.

Clause 18. The method of any of clauses 15-17, wherein the machine-learning model is a hybrid model including a singular spectrum analysis (SSA) and a neural network with at least two layers.

Clause 19. The method of any of clauses 11-18, wherein provisioning the live pool comprises establishing an actively running programming job session on each cluster in the live pool.

Clause 20. The method of any of clauses 11-18, wherein allocating the cluster from the live pool to the user for the programming job comprises configuring the cluster to execute a batch job.

Clause 21. A wide area network, comprising: a plurality of datacenters, each datacenter including computing resources configurable to instantiate at least one node of a cluster for executing programming jobs on the cluster of nodes, wherein the computing resources at one or more of the plurality of datacenters are configured to: provision a live pool including a number of clusters, each cluster in the live pool including a plurality of nodes imaged with a configuration for executing the programming jobs in parallel on the cluster; receive a request from a user to execute a programming job; allocate a cluster from the live pool to the user for the programming job when the cluster is available; evict the cluster from the live pool; and provision a new cluster within the live pool to meet the number of clusters.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for provisioning resources for requests to execute programming jobs on a cluster of nodes, comprising:

a memory storing computer-executable instructions; and

23 at least one processor configured to execute the computer-executable instructions to:

provision a live pool including a number of clusters, each cluster in the live pool including a plurality of nodes imaged with a configuration for executing the programming jobs in parallel on the cluster;

receive a request from a user to execute a programming job;

allocate a cluster from the live pool to the user for the programming job when the cluster is available;

evict the cluster from the live pool in response to allocating the cluster to the user;

provision a new cluster within the live pool to meet the number of clusters in response to evicting the cluster; and dynamically scale the number of clusters in the live pool based on a joint optimization of predicted allocation latency when no cluster is available and a predicted idle time of clusters in the live pool, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

2. The apparatus of claim 1, wherein the at least one processor is further configured to execute the instructions to cause the apparatus to:

receive an indication of an acceptable allocation latency;

calculate the number of clusters that optimizes the predicted allocation latency when no cluster is available and the predicted idle time for a plurality of values of the hyperparameter; and select one of the plurality of values of the hyperparameter that satisfies the acceptable allocation latency.

3. The apparatus of claim 1, wherein the rate of requests from users is a predicted rate of requests for a time period based on a machine-learning model trained to forecast a time series.

4. The apparatus of claim 3, wherein to dynamically scale the number of clusters, the at least one processor is configured to execute the instructions to cause the apparatus to:

train the machine-learning model based on historical request rates to forecast the time series; and provide the forecasted time series to the linear program to optimize the number of clusters in the live pool.

5. The apparatus of claim 3, wherein to dynamically scale the number of clusters, the at least one processor is configured to execute the instructions to cause the apparatus to:

apply historical request rates to the linear program to determine a ground truth of historical optimal pool size for the historical request rates; and train the machine-learning model to forecast a time series of an optimal value of the number of clusters based on the historical optimal pool size.

6. The apparatus of claim 3, wherein the machine-learning model is a hybrid model including a singular spectrum analysis (SSA) and a neural network with at least two layers.

7. The apparatus of claim 1, wherein to provision the live pool, the at least one processor is configured to execute the instructions to cause the apparatus to establish an actively running programming job session on each cluster in the live pool.

8. The apparatus of claim 1, wherein to allocate the cluster from the live pool to the user for the programming job, the at least one processor is configured to execute the instructions to cause the apparatus to configure the cluster to execute a batch job.

9. A method of provisioning resources for requests to execute programming jobs on a cluster of nodes, comprising:

provisioning a live pool including a number of clusters, each cluster in the live pool including a plurality of nodes imaged with a configuration for executing the programming jobs in parallel on the cluster;

receiving a request from a user to execute a programming job;

allocating a cluster from the live pool to the user for the programming job when the cluster is available;

evicting the cluster from the live pool in response to allocating the cluster to the user;

provisioning a new cluster within the live pool to meet the number of clusters in response to evicting the cluster; and dynamically scaling the number of clusters in the live pool based on a joint optimization of predicted allocation latency when no cluster is available and a predicted idle time of clusters in the live pool, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

10. The method of claim 9, further comprising:

receiving an indication of an acceptable allocation latency;

calculating the number of clusters that optimizes the predicted allocation latency when no cluster is available and the predicted idle time for a plurality of values of the hyperparameter; and selecting one of the plurality of values of the hyperparameter that satisfies the acceptable allocation latency.

11. The method of claim 9, wherein the rate of requests from users is a predicted rate of requests for a time period based on a machine-learning model trained to forecast a time series.

12. The method of claim 11, wherein dynamically scaling the number of clusters comprises:

training the machine-learning model based on historical request rates to forecast the time series; and providing the forecasted time series to the linear program to optimize the number of clusters in the live pool.

13. The method of claim 11, wherein dynamically scaling the number of clusters comprises:

applying historical request rates to the linear program to determine a ground truth of historical optimal pool size for the historical request rates; and training the machine-learning model to forecast a time series of an optimal value of the number of clusters based on the historical optimal pool size.

14. The method of claim 11, wherein the machine-learning model is a hybrid model including a singular spectrum analysis (SSA) and a neural network with at least two layers.

15. The method of claim 9, wherein provisioning the live pool comprises establishing an actively running programming job session on each cluster in the live pool.

16. The method of claim 9, wherein allocating the cluster from the live pool to the user for the programming job comprises configuring the cluster to execute a batch job.

17. A wide area network, comprising:

a plurality of datacenters, each datacenter including computing resources configurable to instantiate at least one node of a cluster for executing programming jobs on the cluster of nodes, wherein the computing resources at one or more of the plurality of datacenters are configured to:

provision a live pool including a number of clusters, each cluster in the live pool including a plurality of nodes imaged with a configuration for executing the programming jobs in parallel on the cluster;

receive a request from a user to execute a programming job;

allocate a cluster from the live pool to the user for the programming job when the cluster is available;

evict the cluster from the live pool in response to allocating the cluster to the user;

provision a new cluster within the live pool to meet the number of clusters in response to evicting the cluster; and dynamically scale the number of clusters in the live pool based on a joint optimization of predicted allocation latency when no cluster is available and a predicted idle time of clusters in the live pool, wherein the joint optimization includes a linear program configured to optimize the predicted allocation latency when no cluster is available and the predicted idle time of the number of clusters in the live pool based on at least a rate of requests from users and a hyperparameter that weights the predicted allocation latency when no cluster is available or the predicted idle time of clusters in the live pool.

* * * * *